(12) United States Patent
Webb et al.

(10) Patent No.: US 7,790,653 B2
(45) Date of Patent: Sep. 7, 2010

(54) METHOD AND COMPOSITION TO REDUCE THE AMOUNTS OF ARSENIC IN WATER

(75) Inventors: Cathleen Joyce Webb, Bowling Green, KY (US); Arden Duane Davis, Rapid City, SD (US); David John Dixon, Rapid City, SD (US)

(73) Assignee: South Dakota School of Mines & Technology, Rapid City, SD (US)

( * ) Notice: Subject to any disclaimer, the term of this patent is extended or adjusted under 35 U.S.C. 154(b) by 680 days.

(21) Appl. No.: 11/284,440

(22) Filed: Nov. 21, 2005

(65) Prior Publication Data

US 2006/0186054 A1 Aug. 24, 2006

Related U.S. Application Data

(63) Continuation-in-part of application No. 10/861,586, filed on Jun. 4, 2004, now abandoned.

(51) Int. Cl.
*B01J 20/00* (2006.01)
(52) U.S. Cl. .................................. 502/400; 502/416
(58) Field of Classification Search .............. 502/400, 502/416, 439
See application file for complete search history.

(56) References Cited

U.S. PATENT DOCUMENTS

| | | | |
|---|---|---|---|
| 1,697,095 A | 1/1929 | Turner | |
| 2,145,901 A | 2/1939 | Shoemaker | |
| 3,471,025 A | 10/1969 | Dobson | |
| 3,890,225 A | 6/1975 | Kajiyama | |
| 4,100,064 A | 7/1978 | Gale | |
| 4,118,243 A | 10/1978 | Sandesara | |
| 4,153,556 A | 5/1979 | Riedinger | |
| 4,537,686 A | 8/1985 | Borbely et al. | |
| 4,622,149 A | 11/1986 | Devuyst et al. | |
| 4,935,146 A | 6/1990 | O'Neill et al. | |
| 5,007,964 A * | 4/1991 | Tsukisaka et al. | 106/464 |
| 5,156,746 A | 10/1992 | Maree et al. | |
| 5,205,906 A | 4/1993 | Grutsch et al. | |
| 5,245,120 A * | 9/1993 | Srinivasachar et al. | 588/256 |
| 5,358,643 A | 10/1994 | McClintock | |
| 5,362,394 A | 11/1994 | Blowes et al. | |
| 5,378,366 A | 1/1995 | Yen | |
| 5,556,545 A | 9/1996 | Volchek et al. | |
| 5,603,838 A | 2/1997 | Misra et al. | |
| 5,639,624 A | 6/1997 | Wagner et al. | |
| 5,688,378 A | 11/1997 | Khoe et al. | |
| 5,730,873 A | 3/1998 | Hapka et al. | |
| 5,769,961 A | 6/1998 | Peters et al. | |
| 5,833,841 A | 11/1998 | Koslowsky | |
| 5,908,557 A | 6/1999 | Smith et al. | |
| 5,997,748 A | 12/1999 | Rosenberg et al. | |
| 6,030,537 A | 2/2000 | Shaniuk et al. | |
| 6,042,731 A | 3/2000 | Bonnin | |
| 6,132,623 A | 10/2000 | Nikolaidis et al. | |
| 6,200,482 B1 | 3/2001 | Winchester et al. | |
| 6,200,483 B1 | 3/2001 | Cutler | |
| 6,207,612 B1 * | 3/2001 | Reid et al. | 502/415 |
| 6,210,078 B1 | 4/2001 | Redwine et al. | |
| 6,248,241 B1 | 6/2001 | Christensen et al. | |
| 6,387,276 B1 | 5/2002 | Nikolaidis et al. | |
| 6,461,535 B1 | 10/2002 | de Esparza | |
| 6,790,363 B2 | 9/2004 | Vempati et al. | |
| 2003/0209495 A1 | 11/2003 | Schlegel | |
| 2004/0040912 A1 | 3/2004 | McConchie | |

FOREIGN PATENT DOCUMENTS

JP 1-127094 5/1989

OTHER PUBLICATIONS

E-Water Technologies, "Whole House Anion Water Coditioner" at www.e-watertechnologies.com/Anion%20Resin%20Home%20Page.html, pp. 1-2.
E-Water Technologies, "Under the Sink Reverse Osmosis System" at www.e-watertechnologies.com/RO%20Home%20Page.html, pp. 1-4.
Wholly Water, "The Ultimate Drinking Water Purification System" at www.wholly-water.com/, pp. 1-9.
Pro Star Mechanical Technologies Ltd., "Davnor Biosand Gravity Filters" at www.prostar-mechanical.com/davnor_manual.html, pp. 1-4.
Ultra Pure Water Systems, "Reverse Osmosis Drinking Water Under-Sink 5-Stage Unit" at www.a1ultrapure.com/drink.html, pp. 1-9=8.
USFilter, "GFH™ Granular Ferric Hydroxide Media" at www.usfilter.com/water/ProductDescription.sap?SUBMIT2=Problem+Solver&WID=25&PID=730, pp. 1-2.
Severn Trent Services, "SORB33", at www.severntrentservices.com/water_purification/filtration_products/arsenic/sorb33.jsp, pp. 1-2.
ADI Group, "Water Treatment: Arsenic Removal" at wwwadi.ca/Water/arsenic.html, p. 1.
Tramfloc, Inc., "Application of ActiGard AAFS50 to Arsenic Removal" at www.tramfloc.com/tf77.html, pp. 1-3.
Waste Technologies of Australia Pty. Ltd., "Simple Arsenic Removal Process" at www.arsenic-solutions.com, pp. 1-2.
Water Remediation Technology, LLC., "The Z-33™ Arsenic Removal Process" at http://wrtnet.com/ars/index.html, p. 1.

* cited by examiner

*Primary Examiner*—Edward M Johnson
(74) *Attorney, Agent, or Firm*—Gordon & Rees LLP

(57) ABSTRACT

The present invention relates to a method for removing arsenic in arsenic contaminated water, especially for small drinking water systems such as those used in individual homes, rural areas, and small communities, by simply contacting arsenic-contaminated water with an arsenic removal medium. The present invention also relates to the composition of the arsenic removal medium, which comprises particles of calcium carbonate minerals and magnesium carbonate aggregates.

23 Claims, 12 Drawing Sheets

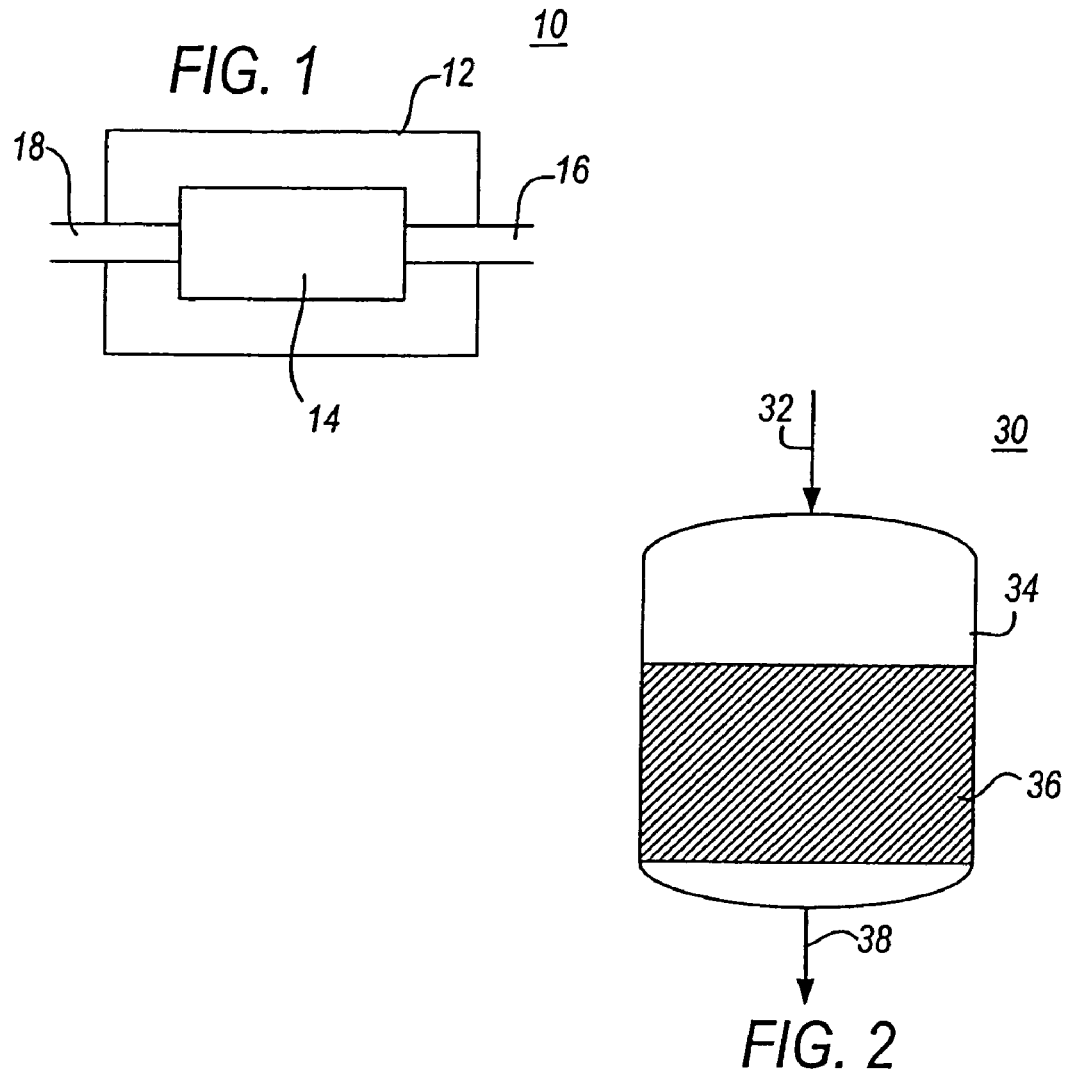
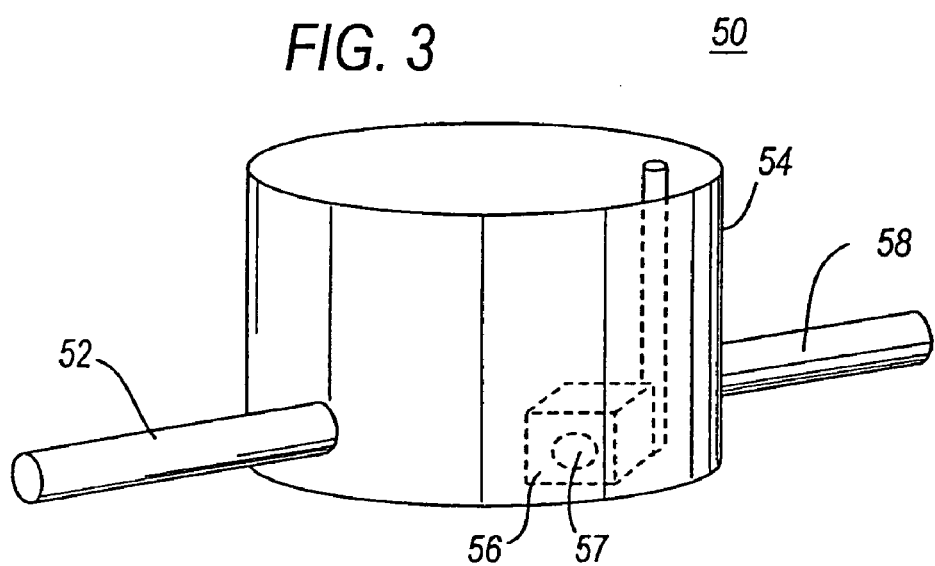

METHOD AND COMPOSITION TO REDUCE THE AMOUNTS OF ARSENIC IN WATER

CROSS REFERENCE TO RELATED APPLICATION

This is a continuation-in-part of pending prior U.S. patent application Ser. No. 10/861,586 filed Jun. 4, 2004, which is a continuation of prior U.S. patent application Ser. No. 09/976,137 filed Oct. 11, 2001. The entire disclosure of these prior applications are considered to be part of the disclosure of this application and are hereby incorporated by reference herein.

FIELD OF THE INVENTION

The present invention relates to a method for removing arsenic in arsenic contaminated water, especially for small drinking water systems such as these used in individual homes, rural areas, and small communities, by simply contacting arsenic contaminated water with an arsenic removal medium. The present invention also relates to the composition of the arsenic removal medium which comprises calcium carbonate mineral particles and magnesium carbonate aggregates.

BACKGROUND OF THE INVENTION

Arsenic is a persistent, bio-accumulative toxin. At a pH of 8 and above, arsenic is readily soluble and thus transports easily through surface and ground water. The United States government drinking water standard for arsenic currently is 50 parts per billion ("ppb"), but is scheduled to be reduced to 10 ppb in 2006 due to its toxicity and possible links to cancer.

Current arsenic remediation technologies are relatively expensive, require substantial technical equipment and trained personnel to achieve significant reductions in arsenic levels, and are generally unsuitable for individual users, rural communities, or relatively smaller water systems. Lowering the federal water standard for arsenic will place significantly increased socio-economic pressures on those water systems that will be required to meet lower standard for arsenic.

According to estimates by the United States Environmental Protection Agency, a water standard of 5 ppb arsenic would cost consumers $374 million per year. In another estimate, the American Water Works Association has estimated a minimum cost of $1.4 billion per year, along with an initial capitalization cost of $14 billion, to meet a 5 ppb standard. An estimated 6,600 water systems nationwide serving at least 22.5 million people would be required to upgrade their existing systems to meet a 5 ppb standard.

When the scheduled 10 ppb federal drinking water standard for arsenic becomes effective, many water systems will be in immediate danger of being out of compliance. For example, the South Dakota Department of Environment and Natural Resources estimates that 30 (10%) of the state's public water systems would violate a drinking water standard for arsenic of 10 ppb. Although larger community water treatment plants in more populous states might be able to meet the proposed federal water standard with existing technology and personnel, smaller water systems and other water systems with limited financial and technical resources might not be capable of doing so. For example, such smaller and other water systems may include individual wells, rural communities, tribal water treatment facilities, urban communities with smaller populations (such as less than 10,000 people), urban communities lacking financial and technical resources to use existing technologies, and individuals desiring on-site arsenic removal regardless of water source.

The need for a low-cost, efficient arsenic removal system for such water systems is not unique to the United States. In many places throughout the world, excessive arsenic in potable water is a critical health issue, regardless of existing or non-existing regulations. The World Health Organization has compiled reports of relatively high levels of arsenic in drinking water in many countries, including Mexico, China, and Bangladesh.

Current remediation technologies commonly considered for removal or reduction of the amounts of arsenic in potable water include ion exchange, coagulation and filtration, activated alumina, lime softening, various iron based medium, and reverse osmosis. Each of these has significant shortcomings. For example, ion-exchange technology currently is used to remove or reduce the amounts of certain contaminants, including arsenic, in water. The removal of arsenic using this technology is based on the charge-charge interaction and thus it is not selective. Anionic ion-exchange resins remove not only arsenic but also other contaminants such as sulfate, selenium, fluoride, and nitrate. Also, suspended solids and iron precipitation can clog the system. In any event, an ion-exchange system must eventually be regenerated, typically by flushing with brine. This results in a concentrated brine solution containing high levels of arsenic and other contaminants, which in turn creates a waste disposal issue. Further an ion-exchange system does not provide an indication of the level of arsenic in the bed or of the bed being saturated with arsenic. Moreover, an ion-exchange system is too expensive, inefficient, and complex for use in smaller water systems or as an end-use application such as a home, farm, business, or individual well.

Coagulation and filtration is a batch process involving segregating a fixed amount of arsenic-contaminated water into a tank, adding iron to coagulate the arsenic, and filtering the batch to remove the coagulated arsenic. This process requires significant capital equipment and trained personnel, and is most efficient at a mid-range pH. As a non-continuous process that is relatively expensive and complex, coagulation and filtration also is unsuitable for smaller water systems or as an end use application.

Both ion-exchange technology and coagulation and filtration have been shown to reduce arsenic in water to about 2 ppb. However, both techniques are more effective when arsenic is in the form of As(V). If As(III) is present, it must first be oxidized to As(V), which adds a pretreatment step, greater costs, and greater technical resources of equipment and personnel. In addition, requirements and expense of the disposal of the resulting arsenic-contaminated sludge must be considered.

Lime softening is a process in which highly trained personnel adjust the pH of the arsenic-contaminated water to a relatively high pH, which facilitates the adsorption of arsenic onto larger particles, such as iron hydroxide, and then reduces the remaining water to a potable pH level. As with the ion-exchange and the coagulation and filtration technologies, lime softening creates a waste product that results in disposal issues, is relatively expensive, requires trained personnel to operate the equipment, and is not a continuous process.

Activated alumina, reverse osmosis, and a variety of other technologies utilizing iron-based medium are other processes that are currently considered for removal or reduction of arsenic in drinking water. Activated alumina requires significant technical intervention and processing, making it impractical for all but larger water systems. Reverse osmosis is not an effective process for this purpose because up to 80 to 90% of the water is discarded. Iron-based media generally involve the use or iron oxide, e.g., sand coated with rust, to attract, remove, and hold arsenic from the water. These processes generally have significant problems with capacity, water, quality, efficiency, and waste disposal. Although having a high capacity for arsenic, granulated ferric hydroxides ("GFH") are extremely expensive and must be disposed of in a certified landfill or recycled industrially. Additionally, granulated ferric hydroxides require substantial technical oversight and are unsuitable for rural and small public water supply systems.

In an industrial application, a published Japanese Patent Application (No. 1-127094) disclosed the use of porous coral limestone in a process to remove arsenic from a waste liquid by absorption of arsenic. In general, the Japanese publication disclosed the use of porous limestone having a void ratio of 10 to 50 cm$^3$/g and particle diameters of approximately 0.1 to 4.5 millimeters. However, this application appears to have used the term, "void ratio", to refer to the reciprocal of the material's density. The term "void ratio", also known as "porosity", used in the art is defined as a ratio of the volume of voids verse the total volume of a rock, is usually expressed as a decimal fraction or a percentage, and is dimensionless. Assuming that it is the case, then the coral limestone used in the application has a very low density, preferably from 0.02 to 0.1 g/cm$^3$. Because additives to the porous limestone absorb arsenic on the surface and in the pores, the amount of arsenic absorbed varies depending on the void ratio of the limestone. When porous limestone is crushed, the pore size eventually decreases, thereby reducing its ability and capacity to absorb arsenic. To improve arsenic absorption, it disclosed that additional process treatments or the addition of specific chemical agents were required, namely ferric chloride, aluminum sulfate, magnesium nitrate, ferric hydroxide, or glutaraldehyde.

Therefore a need exists for a method and composition to reduce the amounts of arsenic in arsenic-contaminated water, particularly with less expense, less complexity, less personnel requirements, and less waste disposal issues. With arsenic levels in drinking water increasingly becoming a health concern in the United States and elsewhere, and with a possible significant reduction in the federal water standard for arsenic in drinking water, this need is particularly acute for home, individual, rural, and relatively smaller drinking water systems.

SUMMARY OF THE INVENTION

In accordance with the present invention, an arsenic removal method for removing arsenic in water includes a step of the water with an arsenic removal medium. The method of the present invention is especially suitable for small drinking water systems such as those used in individual homes, rural areas, and small communities.

In another embodiment of the present invention, a composition of an arsenic removal medium is composed of calcium carbonate particles with a sufficient surface area to interact with arsenic species in solution for efficient arsenic removal from arsenic-contaminated water. The calcium carbonate particles can be from any sources, such as reagent-grade and preferably mineral calcium carbonates. In one aspect, the arsenic removal medium is composed of calcium carbonate particles only, preferably from minerals such as limestones and marbles. In another aspect, the arsenic removal medium also contains a binder, such as Portland cement, to form pellets or granules to facilitate its applications, such as filtration and column separation, in which a flow rate is a great concern. In yet another aspect, the calcium carbonate particles of the arsenic removal medium are treated with water soluble magnesium salts, especially organic salts such as magnesium acetate, to form magnesium carbonate aggregates on the surfaces of those particles. The arsenic removal medium which contains the calcium carbonate particles thus treated typically has much greater arsenic removal efficiency. In yet another aspect, the calcium carbonate particles of the arsenic removal medium are formulated with magnesium carbonate aggregates (that is, particles) to further enhance the arsenic removal efficiency. This formulation can be further processed into pellets and granules by adding a binder such as Portland cement.

BRIEF DESCRIPTION OF THE DRAWINGS

FIG. 1 is a schematic depicting one embodiment of an apparatus and process to reduce the amounts of arsenic in drinking water.

FIG. 2 is a schematic depicting another embodiment of an apparatus and process to reduce the amounts of arsenic in drinking water.

FIG. 3 is a schematic depicting another embodiment of an apparatus and process to reduce the amounts of arsenic in drinking water.

DETAILED DESCRIPTION OF THE INVENTION

Figure 4:
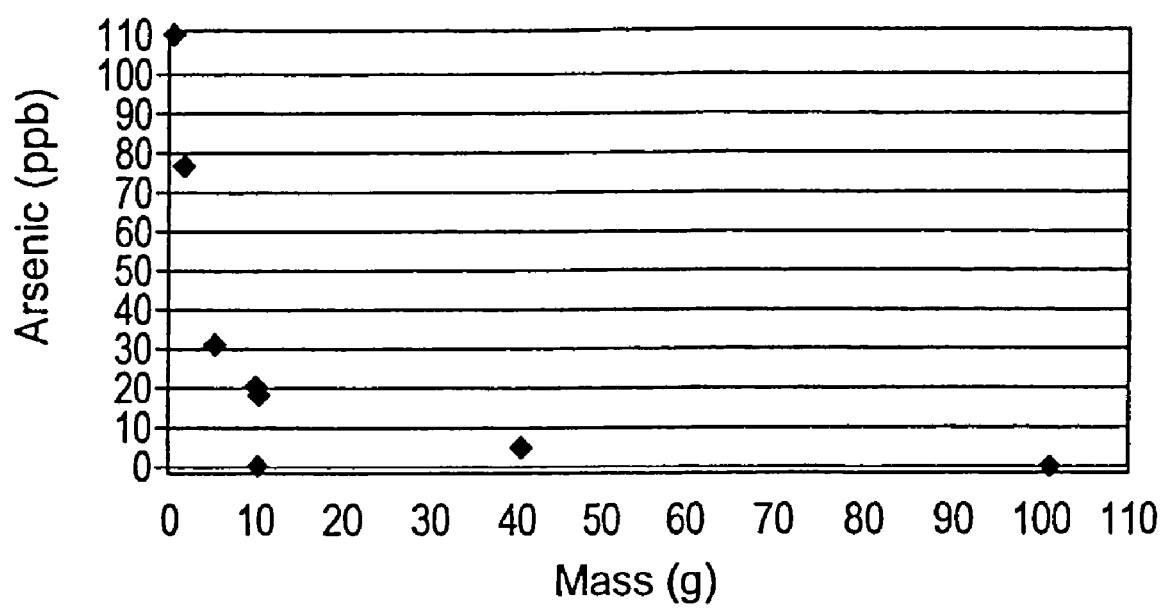
FIG. 4 is a graph depicting adsorption of arsenic by limestone.

The present invention relates to a method for removing arsenic in arsenic-contaminated water, especially for small drinking water systems such as these used in individual homes, rural areas, and small communities, by simply contacting arsenic-contaminated water with an arsenic removal medium. The present invention also relates to the composition of the arsenic removal medium which comprises calcium carbonate mineral particles and magnesium carbonate aggregates.

Arsenic Removal Medium

The major component of the arsenic removal medium of the present invention is calcium carbonate particles, which can be produced from reagent-grade calcium carbonate, calcium carbonate minerals, or mixtures thereof. The three most common minerals of calcium carbonate are calcite, aragonite, and dolomite. Calcite is the most stable crystal form of natural crystalline calcium carbonate. The crystals of calcite can form literally a thousand different shapes by combining the basic forms of the positive rhombohedron, negative rhombohedron, steeply, moderately and slightly inclined rhombohedrons, various scalahedrons, prism and pinacoid to name a few of the more common forms. There are more than 300 crystal forms identified in calcite and these forms can combine to produce the thousand different crystal variations. Calcite also produces many twin varieties that are favorites among twin collectors. There are also phantoms, included crystals, color varieties, pseudomorphs and unique associations. However, the present invention is not limited by the crystal shape. Calcite of any shapes can be used in the present invention.

Calcite is the primary mineral component in many natural stones such as limestone and marble. The calcite used in the present invention is nearly exclusively from limestone. There are many different types of limestone, varying in color, strength, and porosity. Some common ones include micrite, oomicrite, pelmicrite, biomicrite, fossiliferous micrite, biosparite, dismicrite, microspar, fossiliferous limestone, stromatolites, coquina, chalk, oolitic limestone, intraclastic limestone, pelleted or peloidal limestone, crystalline limestone, travertine, tufa, marble, coral limestone, and dolostone. Dolostone is made up of the mineral dolomite, a calcium-magnesium carbonate. Limestones are common materials found in many parts of the world, including the United States. They are readily available and relatively inexpensive, particularly in the quantities utilized in the present invention.

Limestones from different sources can have significant different physical characteristics. For example, coral limestone is clearly different and distinguishable from natural crystalline limestone because coral limestone has not undergone geologic processes and has not become lithified, as crystalline limestone has in its forms. The density of crystalline limestone is typically 2.3 to 2.7 $g/cm^3$, whereas coral limestone typically can be orders of magnitude less dense, in the range of 0.02 to 0.1 $g/cm^3$. The porosity of crystalline limestone typically can be about 1% to less than 20%, whereas the porosity of coral limestone can be 20% or greater.

Aragonite, like calcite, is made up of calcium carbonate ($CaCO_3$). Aragonite is a polymorph of calcite; that is, it differs from calcite in its internal crystalline structure. Aragonite is technically unstable at normal surface temperatures and pressures, converting naturally to calcite. As result, the calcium carbonate of natural limestones is mainly calcite. However, the conversion of aragonite to calcite can be slow, and aragonite sometimes is found in natural environments.

Several factors can affect arsenic removal efficiency of calcium carbonate minerals, including particle shape, size, calcium carbonate content, etc. In one aspect, calcium carbonate minerals used in the present invention may be in a variety of physical forms, including the natural or raw material form, powder, common sand, to dust, chips, clumps, larger chunks, crushed to a specified size or formed into pellets, blocks, or other shapes using processes as agglomeration. Calcium carbonate minerals may also be sintered, which typically increases its hardness and porosity. Since the arsenic removal mechanism of the present invention is a surface phenomenon, the efficiency and capacity of the arsenic removal medium depend on the specific surface area but not the porosity of the calcium carbonate minerals used.

Since calcium carbonate minerals used in the present invention can be from many different rock types and from different regions, the purity and the mineral contents of rocks can be varied dramatically. In the present invention, the amount and types of minerals in the arsenic removal medium are determined by X-ray diffraction analysis, especially the calcite content. Generally, the arsenic removal efficiency is increased as the calcite content increases. In general, the calcite content of the present invention is preferably no less than about 70%, more preferably no less than about 80%, most preferably no less than about 90%.

In another aspect, various particle sizes of calcium carbonate minerals can be used. For the arsenic removal medium of the present invention, the arsenic removal efficiency is increased as the particle size decreases. For a given volume, smaller pieces have greater surface area as measured by BET (Brunauer, Emmett, and Teller) specific surface area, and therefore greater sites with which the arsenic may be able to interact. Typically, the calcium carbonate minerals used in the present invention are small particles with a diameter from approximately 0.001 mm to approximately 7 mm, preferably from approximately 0.001 mm to approximately 2 mm, and more preferably from approximately 0.001 mm to approximately 1 mm. The calcium carbonate minerals used in the present invention can have a BET specific area from 0.1 to 20 $m^2/g$, preferably from 0.2 to 10 $m^2/g$, more preferably 0.3 to 5 $m^2/g$. Alternatively, calcium carbonate minerals may be formed into pellets (granules) with a diameter from approximately 0.001 mm to approximately 2 mm, and preferably from approximately 0.005 to approximately to 1 mm in diameter. Pellets formed can have a BET specific area from 0.1 to 20 $m^2/g$, preferably from 1 to 10 $m^2/g$, more preferably 2 to 8 $m^2/g$. The particle size will normally be selected for the effect to be achieved in the finished product, and mixtures of particle sizes can be used in combination.

Other properties of calcium carbonate minerals which may also affect the efficiency and capacity of arsenic removal medium of the present invention include density and porosity. Because the arsenic removal mechanism of the present invention is through the precipitation reaction of arsenic species with calcium or magnesium carbonates on the surface of calcium carbonate minerals, however, these two factors should have very limited effects. Therefore, the present invention is not limited by the density or porosity of calcium carbonate minerals. In one aspect, however, it is preferable that the calcium carbonate mineral used in the present invention has a density of no less than 0.2 $g/cm^3$, more preferably no less than 0.5 $g/cm^3$, yet more preferably no less than 1 $g/cm^3$, yet more preferably no less than 1.5 $g/cm^3$, and most preferably no less than 2 $g/cm^3$. In another aspect, it is preferable that the calcium carbonate mineral has a porosity of no greater than 70%, more preferably no greater than 50%, yet more preferably no greater than 30%, yet more preferably no greater than 20%, yet more preferably no greater than 15%, yet more preferably no greater than 10%, and most preferably no greater than 5%.

In one embodiment of the present invention, the arsenic removal medium contains only calcium carbonate minerals. The calcium carbonate mineral can be calcite, aragonite, dolomite, and mixtures thereof. Preferably, the calcium carbonate is calcite mineral. The mineral calcite used in the present invention can be from various limestones. In one aspect, the limestone preferably has a void ratio (or porosity) of no greater than about 30%, more preferably no greater than about 20%, yet more preferably no greater than about 15%, yet more preferably no greater than about 10%, most preferably no greater than 5%. In another aspect, the limestone preferably has a density of no less than 0.2 g/cm$^3$, more preferably no less than 0.5 g/cm$^3$, yet more preferably no less than 1 g/cm$^3$, yet more preferably no less than 1.5 g/cm$^3$, and most preferably no less than 2 g/cm$^3$. For limestone and alike, the arsenic removal efficiency of the arsenic removal medium is increased as the percentage of calcite increases. To ensure high arsenic removal efficiency, the arsenic removal medium contains no less than 80% by weight of calcium carbonate minerals, more preferably no less than 90%.

In another embodiment, the arsenic removal medium contains calcium carbonate minerals and one or more binders. The mixture of calcium carbonate minerals and binders can then be processed into granules. This process is especially useful for these materials with grain sizes less than 0.2 mm in diameter. The particles of such size are too small to be used practically in a flow-through system, simply because the flow rate is going to be too slow and back pressure will be too high. Granulation of these fine powders can be accomplished through all well-known technologies as in the art, such as agglomeration. Agglomeration takes fine materials and transforms them into spherical granules. One advantage of agglomeration is that it significantly increases material surface area without compromising flow through rates.

Typically, a binder, such as hydraulic cement, is added to the material mix to bond the individual particles together and to strengthen the granules. The hydraulic cement used in the present invention includes Portland cement, modified Portland cement, or masonry cement, and mixtures thereof. By Portland cement is meant all cementitious compositions which have a high content of tricalcium silicate and includes Portland cement and cements that are chemically similar or analogous to Portland cement, the specification for which is set forth in ASTM specification C 150-00. Other types of binders suitable for uses in the present invention include alkaline silicates, silica hydrosol, alumina, silica-alumina, gypsum, plaster of paris, and colloidal clays.

Water is sprayed into the mixture of ore particles and a binder such as Portland cement, and the mixture is then tumbled until granules form. The granules are sieved and dried in a curing room. When an appropriate amount of a water insoluble binder is used, the granules are firm enough to hold their shape in a column and do not disintegrate when exposed to water. The amounts of components in the arsenic removal medium can vary between 50 and 95 wt % calcium carbonate minerals and between 50 and 5 wt % of one or more binders. Preferably, the arsenic removal medium contains over 70% by weight of calcium carbonate minerals, more preferably over 85%, and most preferably over 90%.

The arsenic removal efficiency of calcium carbonate minerals used in the present invention can be further enhanced through chemical modifications and formulations. The increased efficiency can significantly decrease the amount of waste materials, the amount of handling by personnel, the size and quantity of equipment for a given system, and thus the overall cost of removing arsenic down to the lowered levels.

In one embodiment, the surface of calcium carbonate particles is modified chemically to improve the arsenic removal efficiency. A variety of inorganic and organic chemicals can be used for this purpose, including ferric chloride, ferric hydroxide, aluminum sulfate, and magnesium hydroxide. Water-soluble magnesium salts of organic and inorganic acids can also be used. Examples of suitable inorganic magnesium salts include, without limitation, magnesium halides such as chloride, bromide, and iodide, and magnesium nitrate. Examples of suitable organic magnesium salts include, without limitation, carboxylates such as formate, acetate, propionate, and butyrate; dicarboxylates such as oxalates, malonates, succinates, glutarates, adipates, maleates, and fumarates; and hydroxycarboxylates such as lactate and gluconate. A combination or mixture of any of the foregoing chemicals can also be used.

Preferably, calcium carbonate particles are chemically modified with magnesium salts, more preferably magnesium organic salts, to improve arsenic removal efficiency. Typically, the chemical modification involves exposing calcium carbonate particles with desired sizes to a concentrated magnesium salt solution so that calcium cations on the surface of calcium carbonate particles can exchange with magnesium cations in solution to form magnesium carbonate aggregates nearly exclusively on the surface of the particles. Essentially, the calcium carbonate particles are coated with magnesium carbonate. The magnesium carbonate thus formed is accessible and readily reacts with arsenic compounds in arsenic-contaminated water. The $Ca^{2+}/Mg^{2+}$ exchange on the particle surface can be accelerated by physical agitation such as magnetically stirring. Additionally, factors such as reaction temperature and duration, magnesium salt concentration, the amount of calcium carbonate minerals and particle sizes can also affect the extent of the exchanges. The amount of magnesium on the particle surface can be estimated by elemental analysis and can be expressed as percentage of magnesium ion over the total of calcium and magnesium ions, preferably, greater than 1%, more preferably greater than about 5%, even more preferably greater than 10%.

In another embodiment, the arsenic removal efficiency and capacity of calcium carbonate minerals is increased by mixing with other additives, such as magnesium carbonate. Magnesium carbonate is widely available commercially as a solid powder and preferably is physically mixed with calcium carbonate minerals. The amount of magnesium carbonate in this composition preferably is no greater than about 10% by weight, more preferably no greater than 8%, most preferably no greater than 6%. For example, the arsenic removal medium having magnesium carbonate about 10% by weight, the arsenic removal efficiency can be doubled. The mixture of calcium carbonate minerals, additives, and binders can be further processed into granules or pellets as described hereinabove. The amounts of components in the arsenic removal medium can vary between 10 and 90 wt % calcium carbonate minerals to 90 and 10 wt % of one or more additives and binders.

Other additives may be employed to increase the adsorption of arsenic from solution. For example, activated aluminum may work, but creates reaction products that are difficult and expensive to handle. Iron oxide may work, but also creates processing problems, including rust formation, iron precipitates, and iron staining of water.

When the arsenic removal medium is used to remove arsenic from water, the level of arsenic in the water is reduced, preferably to below approximately 30 parts per billion, more preferably to below approximately 20 parts per billion, even more preferably to below approximately 10 parts per billion and most preferably to below approximately 5 parts per billion.

Process and Apparatus:

The arsenic-contaminated water may be from any source of water, including surface and underground sources, and may be used for water directed to any water system or user, including large water treatment systems, rural or smaller water systems, or individual users. The relative simplicity of the present invention substantially reduces the cost and technical requirements of conventional arsenic remediation techniques, which makes it particularly useful for individual users, rural communities, or relatively smaller water systems. The present invention may be employed at the point of the source of the water, at the point of use by the end user, or at any point between the source and the user. The water may contain arsenic in levels considered to be unhealthy for human consumption or use, e.g., up to 100 ppb arsenic and higher.

Contacting arsenic-contaminated water with the arsenic removal medium of the present invention may be accomplished in a variety of ways. For example, arsenic-contaminated water may be passed in a substantially continuous flow through a filter containing the arsenic removal medium. As shown in FIG. 1, the arsenic contaminated water may be introduced into filter system 10 through inlet 16, passed in a substantially continuous flow through cartridge 14 containing the arsenic removal medium, and removed from the filter system 10 through outlet 18. The filter system 10 preferably comprises a housing 12 to hold the cartridge 9 containing the arsenic removal medium, particularly in a point-of-use application utilizing a filter system. When the arsenic removal medium is in need of replacement, the cartridge 14 may be supplied with additional or replacement arsenic removal medium or preferably the cartridge 14 may be removed and replaced with another cartridge containing fresh arsenic removal medium. A filter system 10 for a point of use application preferably would be sufficient compact to be installed within the house or building, more preferably under the sink or otherwise near the faucet. For such applications, the housing 12 and cartridge 19 preferably would be approximately 2 to 3 feet in length and approximately 3 to 6 inches in diameter and be configured to contain approximately 10 to 15 pounds of arsenic removal medium.

In a filter system application, the preferred size, shape, and other characteristics of the arsenic removal medium generally depend on the desired flow rate of water, the level of arsenic contamination, the arsenic removal medium used, and other factors. In general, as the size of the arsenic removal medium particles become smaller, the flow rates of the water through the filter decrease, eventually allowing insufficient or even no water to flow through the filter. On the other hand, as the size of the arsenic removal medium particles become larger, the number of potential reaction sites decreases and the efficiency of the system decreases. In a filter system application for an individual user, the limestone or dolomite is preferably crushed or ground, preferably to approximately 0.001 mm to approximately 7 mm in diameter, more preferably to approximately 0.001 mm to approximately 2 mm in diameter, and most preferably to approximately 0.001 mm to approximately 1 mm in diameter. Alternatively, the limestone or dolomite may be formed into pellets (granules), preferably approximately 1 mm to approximately 2 mm in diameter or larger, and most preferably to approximately 0.005 to approximately to 1 mm in diameter. As the volume of water to be treated increases, the amount of arsenic removal medium to be used also increases, with the arsenic removal medium preferably ground as fine as practicable.

In another embodiment of the present invention, the arsenic-contaminated water may be passed through a packed column containing the arsenic removal medium. As shown in FIG. 2, arsenic-contaminated water is introduced through inlet 32 into packed column 34 containing the arsenic removal medium 36. The water passes through the packed column of arsenic removal medium 36, which reduces the amounts of arsenic in the water, and exits the packed column 34 through outlet 38.

The preferred size and characteristics of the column depend upon the end-use application. For a single household, the column may be small enough to fit under the sink or large enough to treat all of the household water. Generally, the size of any particular unit is a function of the desired water effluent flow rate, the acceptable pressure drop, and the desired length of time for the arsenic removal medium in the column to be in service. A column system has an advantage over a reservoir system in that the effluent water is treated and usable up until the time of arsenic breakthrough, which occurs when the arsenic concentration in the effluent water reaches an undesirable level. At that point, the packed column arsenic removal medium is nearly saturated with arsenic compounds. The column may then be removed and replaced with another column containing fresh arsenic removal medium. Preferably, the arsenic removal medium is packed into the column so as to minimize water bypassing the arsenic removal medium and to minimize escape of the arsenic removal medium into the effluent water. For example, the arsenic removal medium may be packed in a gradient of sizes or with different particle sizes, e.g., with the smallest particles in the middle of the column and the largest sizes toward the outside. Inert materials, such as sand, or active materials, such as activated carbon, may also be used in the column ends to retain the fine arsenic removal medium particles. Screens or filters may be used to retain the arsenic removal medium particles.

In an application utilizing a packed column, the preferred size, shape, and other characteristics of the arsenic removal medium will depend on the desired flow rate of water, the allowable pressure drop, the desired velocity of water through the column, the level of arsenic contamination, the arsenic removal medium used, and other factors. Again, as the size of the arsenic removal medium particles become smaller, the flow rates of the water through the filter decrease, eventually allowing insufficient or even no water to flow through the filter. On the other hand, as the size of the arsenic removal medium particles become larger, the number of potential reaction sites decreases and the efficiency of the system decreases. In a packed column application, the arsenic removal medium is preferably crushed or ground and classified to approximately 0.001 mm to approximately 10 mm in diameter, more preferably to approximately 0.001 mm to approximately 1 mm in diameter, and most preferably to approximately 0.001 mm to approximately 0.1 mm in diameter. Alternatively, the arsenic removal medium may be formed into pellets, preferably approximately 1 mm to approximately 2 mm in diameter/length, and most preferably to approximately 0.005 to approximately to 1 mm in diameter/length. As the volume of water to be treated increases, the amount of arsenic removal medium to be used increases and the arsenic removal medium preferably is crushed to a relatively smaller particle size.

In yet another embodiment of the invention, arsenic-contaminated water may be treated within a reservoir, including a reservoir used as storage. As shown in FIG. 3, in a reservoir treatment system 50, arsenic-contaminated water is introduced through inlet 52 into reservoir 54. Arsenic removal medium 57 is placed into reservoir 54 such that the arsenic-contaminated water comes in contact with at least a portion of the arsenic removal medium 57 before exiting through outlet 58. The reservoir 54 may be anything that is capable of holding a volume of water, such as a well, a tank, or a tower. Water in relatively small reservoirs, such as individual water bottles or containers, may also be treated by placing the arsenic removal medium into an enclosure, such as a tea bag, that is adapted to allow direct contact between the arsenic removal medium and the water when the enclosure is inserted into the reservoir. The arsenic removal medium 57 may be placed in contact with the arsenic-contaminated water in any number of ways, including placing and mixing the arsenic removal medium 57 directly into the water, inserting into the arsenic-contaminated water a container, such as a bag with a porous membrane or a cage-like box that allows direct contact between the arsenic contaminated water and the arsenic removal medium 57 held within the container, or by positioning the arsenic removal medium 57 in proximity to the outlet of the reservoir. Alternative methods may include incorporating the arsenic removal medium through materials processing techniques into a rigid yet porous base or by incorporating the arsenic removal medium as a surface coating on a rigid, porous medium.

In an application where the arsenic removal medium is inserted into a reservoir, the preferred form of arsenic removal medium depends in part on the apparatus employed to house the arsenic removal medium. For example, a bag or other container comprising a porous membrane may contain arsenic removal medium that is finely ground, crushed, coarsely broken into pieces, blocks, natural or simply in the form that is most readily available. The openings in the membrane are designed to be sufficiently large to allow water to pass through the membrane but sufficiently small to contain the arsenic removal medium. In this application, it is preferred to employ an arsenic removal medium that is relatively finely ground, such as approximately 0.001 mm to approximately 1 mm in diameter, to provide a relatively large number of potential reaction sites for the arsenic. For example, a membrane composed of plastic or similar materials may be used to contain arsenic removal medium ground to approximately 0.001 mm to approximately 1 mm in diameter. Larger openings in the membrane or in the sides of the container preferably would result in using correspondingly larger-size particles of arsenic removal medium. In a simple form, a single block of arsenic removal medium may be placed on a platform or in an open cage. Most preferred is arsenic removal medium finely ground to submicron particle size and molded to form porous pellets approximately 1 mm to approximately 2 mm in diameter, and preferably to approximately 0.1 to approximately to 0.5 mm in diameter, and most preferably to approximately 0.5 mm to approximately 1 mm in diameter.

As an example, one may consider the case of a relatively small water treatment plant for approximately 250 to 300 homes that utilizes water from a well and stores it in a water tower. In such a system, one may employ the present invention in a variety of ways, including by distributing filter systems or packed column systems to each end user, installing a packed column at the effluent of the water tower, inserting the arsenic removal medium into the water tower, as set forth above, or installing a packed column to treat the water before it is stored in the water tower. In this case of a relatively small water treatment plant, it is generally preferred to either distribute filter arsenic removal medium systems to each end user or to install a packed column to treat the water before it is stored in the water tower, alternatively, by providing each end user with a packed column arsenic removal medium system, the end user may preferentially treat only the water that needs to be treated. This will lower the expense to the end user, who may selectively treat only water to be used for human consumption and not treat water for other uses, such as for plants, the lawn, in toilets, etc.

Over time, the arsenic removal medium will be consumed by its reaction with the arsenic in the water and will need to be replaced with fresh arsenic removal medium. The length of time between such replacement of arsenic removal medium will depend on a number of factors, including the volume of water treated, the amount of arsenic and other contaminants in the water, and the amount, size, shape, and type of arsenic removal medium used, among other things. To determine the appropriate time to replace the arsenic removal medium, the operator may regularly follow a proscribed schedule based on these factors, as provided by the supplier, or preferably test the water and/or the arsenic removal medium to determine whether replacement of the arsenic removal medium is necessary or desired.

Employing the present invention to treat even relatively large volumes of water with arsenic in amounts above drinking-water standards produces a relatively small and compact amount of solid arsenic removal medium with adsorbed arsenic. Because the arsenic is believed to be strongly bound to the arsenic removal medium, arsenic is not expected to significantly leach out under normal waste disposal conditions. For example, using limestone as the arsenic removal medium in the present invention generates an arsenic-laden waste limestone, which is relatively stable, even when subjected to the low pH (pH=2.88) environment of a Toxicity Characteristic Leaching Procedure Test.

EXAMPLES

The efficiency of an arsenic removal medium of the present invention is generally evaluated using either batch or column experiments. Batch experiments were conducted using Minnekahta Limestone as the primary limestone source. Other limestone units and additives to improve efficiency were also tested as appropriate. The limestone was crushed using a roller crusher and then sieved to various size ranges. Samples of the limestone adsorbent were placed in labeled round-bottomed flasks. Samples were mixed with 100 mL of varying arsenic solution concentrations (depending on the experiment). Arsenic solutions were pH-balanced to a pH of 8 prior to mixing with the material sample. In addition, batch tests included a blank sample of 100 mL deionized water rather than arsenic solution. Sample flasks were secured to a wrist shaker and agitated for 48 hours unless otherwise stated in the experiment description. After mixing, the samples were filtered with a 0.45 μm filter. The samples were then analyzed for arsenate concentration. The pH and conductivity of the samples were also measured.

Column experiments were conducted using Minnekahta Limestone. Material with a particle size range of 0.2-0.5 mm was used primarily, although columns with other limestone size ranges and with manufactured limestone granules were also run. The columns were constructed of PVC pipe of varying diameters and lengths, depending on the column design. Influent arsenic solution was mixed to varying concentrations, depending on the experiment, and pH balanced to a pH of 8. Influent was pumped into the column from the bottom up at a constant flow rate. Samples of effluent were collected regularly. The pH and conductivity of the effluent were measured and the samples were analyzed for arsenate concentration.

Example I

Batch Study of Arsenic Removal with Limestone

A batch experiment was conducted with 100 mL water containing 109 parts per billion arsenic. Limestone in the form of 5 to 7 millimeter grain size was added in small increments to separate flasks, each containing 100 mL of water at 109 parts per billion arsenic. The flasks were agitated for 48 hours and the final arsenic concentration was measured. The results are shown in FIG. 4, which indicates a marked reduction in arsenic concentrations (to 5 parts per billion or less) with relatively small amounts of limestone (40 to 100 grams).

In this batch experiment, limestone in all of the grain sizes tested, ranging from 0.001 mm to 7 mm in diameter, reduced arsenic concentrations from greater than 100 parts per billion to less than 5 parts per billion. In general, the arsenic-removal process in these experiments was more efficient with smaller grain sizes of limestone and most efficient with the smallest grain sizes tested. This experiment indicates that the use of limestone in the present invention is capable of effectively reducing the amounts of arsenic in water from even relatively high levels to less than 5 parts per billion.

Example II

Batch Study of Arsenic Removal with Limestone pH Effect

Figure 5:
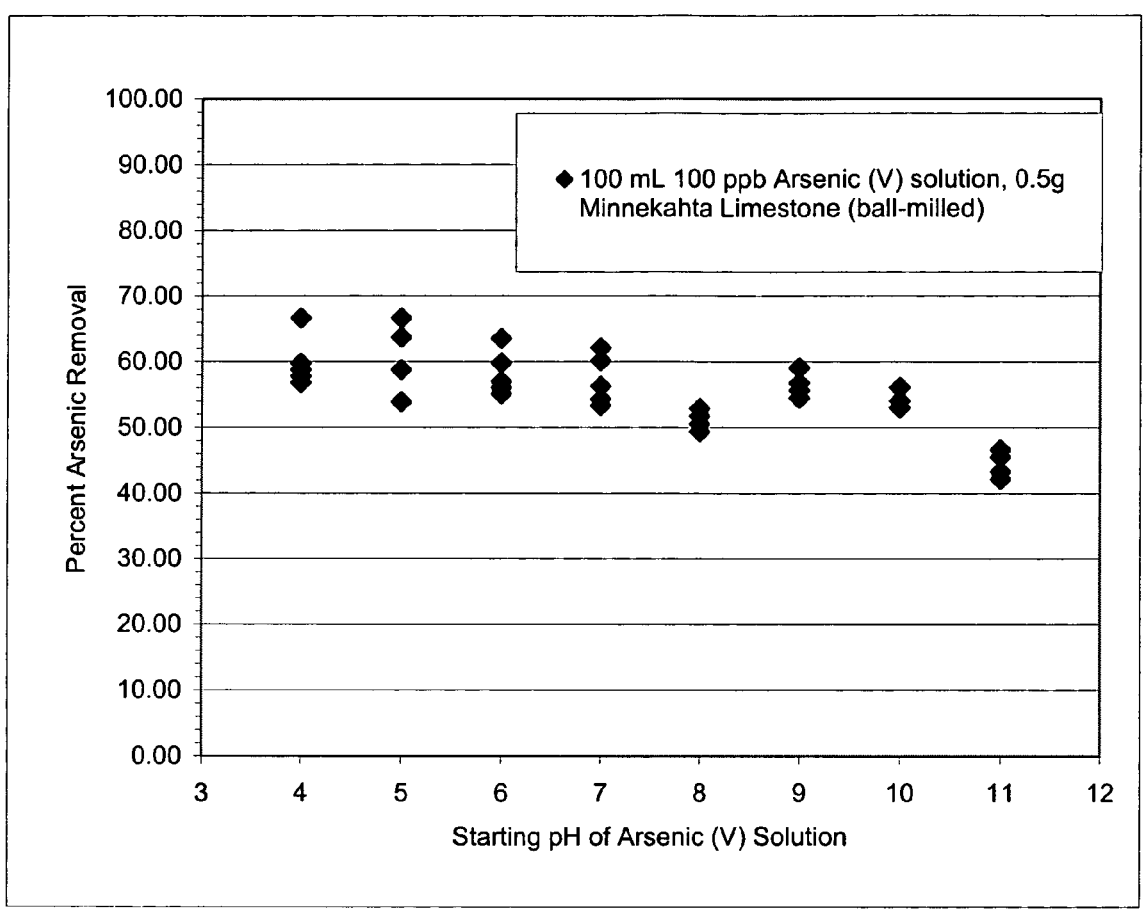
FIG. 5 is a graph depicting the pH of arsenic-contaminated water and adsorption of arsenic.

A series of batch tests were done to confirm that pH has a limited influence over arsenic removal by limestone. In each test, 0.5 grams of Minnekahta limestone of ball-milled size was agitated with 100 mL water containing 100 ppb arsenic for 48 hours at varying initial pH values. The grain size of the limestone was 1-2 mm. The results are shown in FIG. 5, which indicates a reduction of the arsenic concentration to approximately 10 parts per billion or less throughout the pH range tested. These experiments demonstrate that the present invention effectively reduces the amounts of arsenic in water throughout a relatively wide variance of pH, including the common, naturally occurring pH range of water. No other current available arsenic remediation technology works uniformly over this pH range without an additional pH adjustment treatment.

Example III

Arsenic Removal with Limestone

Oxidation

Figure 6:
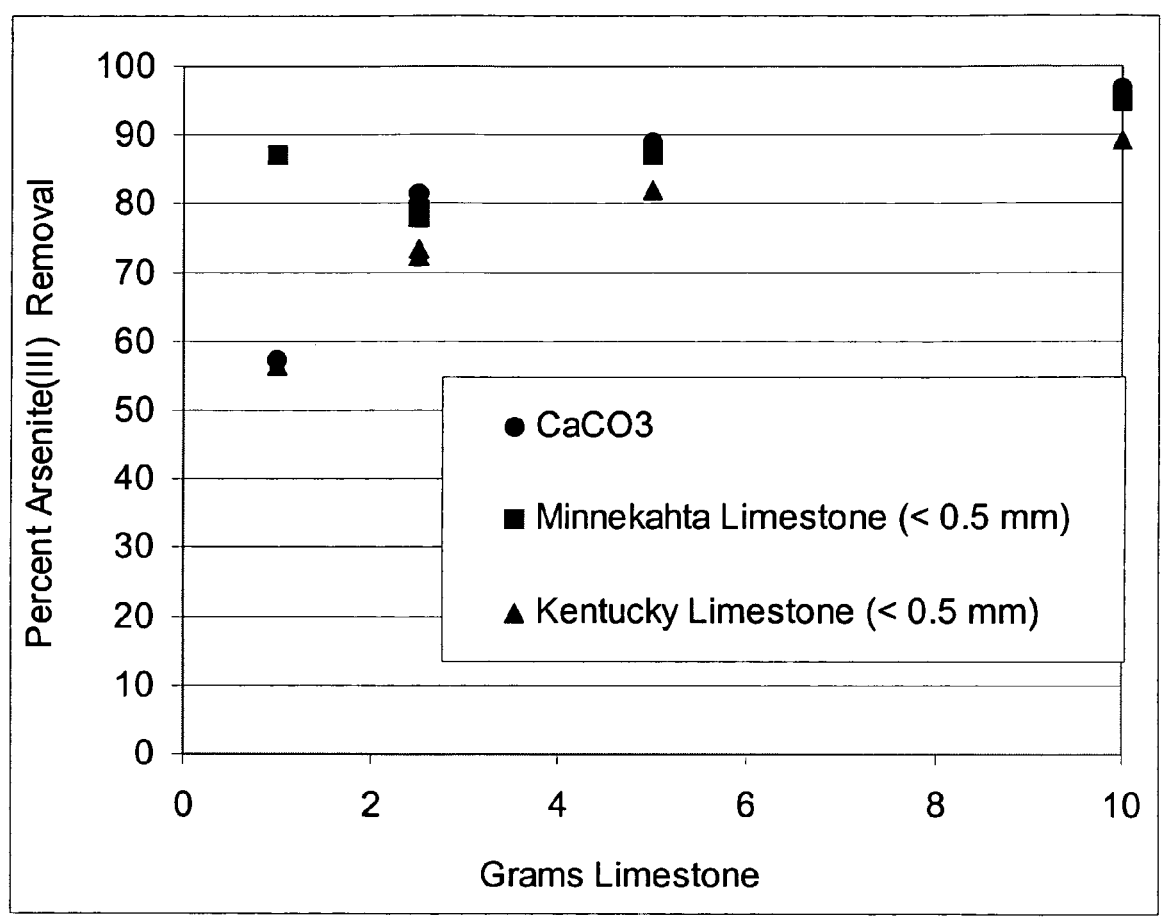
FIG. 6 is a graph depicting percent oxidized arsenite removal by $CaCO_3$ and limestone.

Arsenite solution was first oxidized to arsenate by the addition of an oxidant, sodium hypochlorite. A sodium hypochlorite solution of 2 ppm was added to 200 ppb arsenite solution adjusted to pH 8. The solution was magnetically stirred for 10 minutes to ensure complete oxidation of the As(II) to As(V). Batch experiments were then performed using 100 mL of oxidized As(III) solution and varying mass amounts of calcium carbonate, Minnekahta Limestone (<0.5 mm sieve size) and Saint Genevieve (Kentucky) Limestone (<0.5 mm sieve size). As summarized in FIG. 6, calcium carbonate effectively removed 80% on average of the oxidized arsenite, Minnekahta Limestone 85% on average, and Saint Genevieve (Kentucky) Limestone 75%. The final concentrations of As(III) were reduced as low as 6 ppb with 10 grams of limestone used.

Example IV

Batch Study of Arsenic Removal with Treated Limestone

In this experiment, native limestone and reagent-grade $CaCO_3$ particles were modified using concentrated magnesium acetate solution in order to improve arsenic removal efficiency of the limestone material. The modification of limestone involves exposing the limestone to a concentrated magnesium acetate solution so that calcium ions ($Ca^{2+}$) from naturally occurring limestone or $CaCO_3$ will surface exchange with magnesium ions ($Mg^{2+}$) from the concentrated solution on an atomic scale. The surface exchange reaction occurring during the modification of limestone with magnesium acetate is shown below. Surface exchange experiments were conducted by adding a known concentration of magnesium acetate solution to a known amount of limestone. The solution was then magnetically stirred.

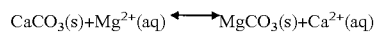

Initial surface exchange experiments were done by adding 500 mL 1.33 moles/L of magnesium acetate solution to either 25 g of calcium carbonate or 25 g of Minnekahta Limestone (ball-milled fines and 1-2 mm sieve size) or Kentucky Limestone (Ste. Genevieve Limestone) (1-2 mm) and magnetically stirring the solution for 24 hours. The equilibrium constant ($K_{eq}$), Gibbs free energy change of reaction ($\Delta G_{rxn}°$), and $\Delta G$ were calculated for the surface exchange reaction. Calculations showed that $\Delta G°=+17$ kJ under standard conditions, indicating that the surface exchange process is not favored thermodynamically. Batch experiments have shown that little or no exchange occurred with the limestone of sieve size (1-2 mm), whereas the surface exchange resulted in an increase in magnesium and decrease in calcium content in $CaCO_3$ and Minnekahta Limestone ball-milled fines. The arsenic removal using magnesium-acetate-treated $CaCO_3$ or magnesium acetate treated limestone of ball-milled fines effectively removed up to 90 percent arsenic while same amounts of untreated limestone removed about 65 to 90 percent of the arsenic. The arsenic removal efficiency of the magnesium acetate treated limestone (1-2 mm) decreased slightly compared to untreated limestone (1-2 mm).

Additional surface exchange experiments were done by adjusting the $\{Mg^{2+}\}/\{Ca^{2+}\}$ ratio, and increasing the temperature and the reaction time in order to bring the process closer to equilibrium. Experiments were conducted by adding 15 g of limestone to 250 mL 2.5 moles/L of magnesium acetate solution and shaking it with a wrist shaker at 66° C. for 1 week. Table 4 shows the concentrations of calcium and magnesium in $CaCO_3$, Minnekahta limestone (ball-milled fines and 1-2 mm sieve size) and Kentucky limestone (Ste. Genevieve limestone) (ball-milled fines and 1-2 mm sieve size) before and after surface exchange. Results shown in Table 1 indicate that the surface exchange conducted at 66° C. for 1 week resulted in a significant increase in magnesium content in calcium carbonate and limestone.

TABLE 1

Calcium and Magnesium Contents

| | Before Surface Exchange | | After Surface Exchange | |
|---|---|---|---|---|
| Limestone Type | Calcium, ppm | Magnesium, ppm | Calcium, ppm | Magnesium, ppm |
| 15 g $CaCO_3$ in 250 mL 2.5 moles/L magnesium acetate solution @ 66° C. for a week | 15200 | 1.68 | 6700 | 1319 |
| 15 g Minnekahta limestone ball-milled in 250 mL 2.5 moles/L magnesium acetate solution @ 66° C. for a week | 9400 | 95.3 | * | 2100 |

TABLE 1-continued

Calcium and Magnesium Contents

| | Before Surface Exchange | | After Surface Exchange | |
|---|---|---|---|---|
| Limestone Type | Calcium, ppm | Magnesium, ppm | Calcium, ppm | Magnesium, ppm |
| 15 g Minnekahta limestone (1-2 mm) in 250 mL 2.5 moles/L magnesium acetate solution @ 66° C. for a week | 11300 | 60.7 | 8800 | 1000 |
| 15 g St. Genevieve limestone ball-milled in 250 mL 2.5 moles/L magnesium acetate solution @ 66° C. for a week | 18,300 | 244 | 17,100 | 4700 |
| 15 g St. Genevieve limestone (1-2 mm) in 250 mL 2.5 moles/L magnesium acetate solution @ 66° C. for a week | * | 0.145 | 25,300 | 2600 |

*Sample destroyed.

Figure 7:
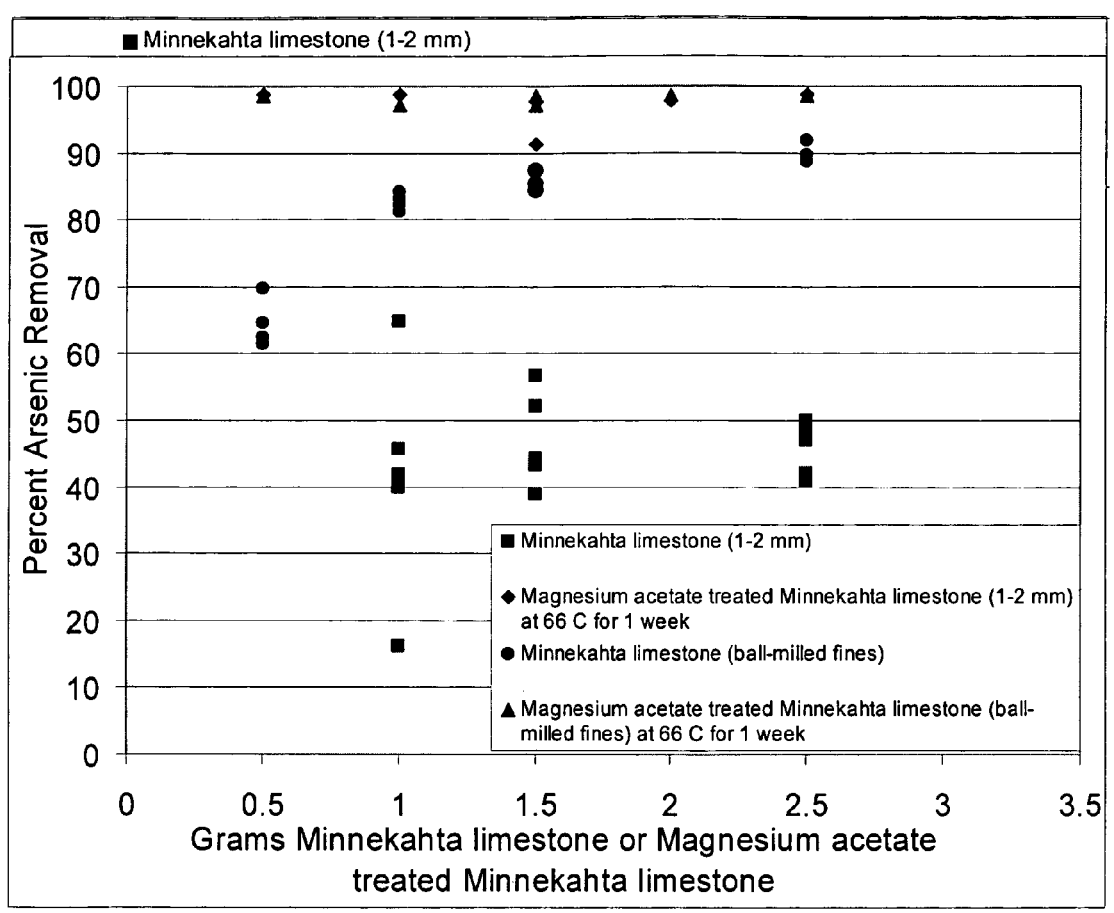
FIG. 7 is a graph depicting a comparison of the arsenic removal efficiency of Minnekahta Limestone and magnesium-acetate-treated Minnekahta Limestone.
Figure 8:
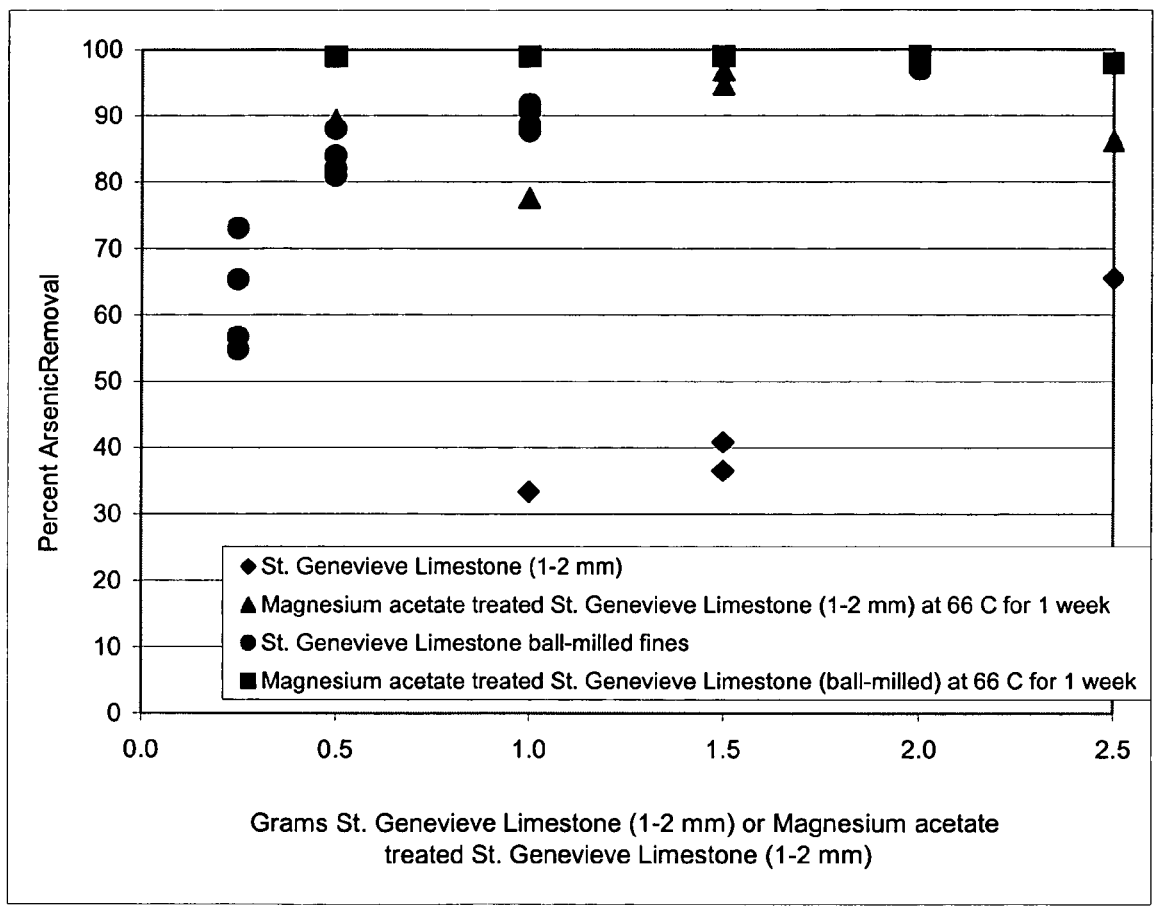
FIG. 8 is a graph depicting a comparison of the arsenic removal efficiency of Kentucky Limestone (Ste. Genevieve Limestone) and magnesium-acetate-treated Kentucky Limestone (Ste. Genevieve Limestone).

Batch tests were then performed to compare the adsorptive capacity of the treated limestone with the adsorptive capacity of untreated limestone. Results from FIGS. 7 and 8 show that magnesium-acetate-treated limestone (ball-milled fines and 1-2 mm sieve size) effectively removes arsenic at 99% regardless of the amount of limestone used. Batch test results indicate that 2.5 g of untreated Minnekahta Limestone (ball-milled fines) or 2.0 g of untreated Kentucky Limestone (Ste. Genevieve Limestone) ball-milled fines can effectively removes up to 95% arsenic. However, 99% removal efficiency can be obtained by using only 0.5 g of treated limestone of ball-milled fines or 0.5 g of treated limestone of 1-2 mm sieve size.

Example V

Granulation of Limestone Using an Agglomeration Process

In order to maintain high surface area without compromising the flow-through rate, powdered limestones with a grain sizes less than 0.2 mm in diameter were processed through agglomeration into spherical granules. To enhance the mechanical strength of their granules, a water-insoluble binder, Portland cement, was also added to yield a mixture with 10% binder. During agglomeration, water was sprayed into the mixture of limestone and binder and the mixture was tumbled until granules formed. The granules were then sieved and dried in a curing room. The granules are firm enough to hold their shape in a column and do not disintegrate when exposed to water because the binder used is insoluble.

Additives can also be added to the dry mixture in order to enhance arsenic removal efficiency. Granules of limestone with Portland cement binder and two different additives, magnesium carbonate and calcium carbonate, were also prepared.

Example VI

Batch Study of Arsenic Removal with Granular Limestone

Figure 9:
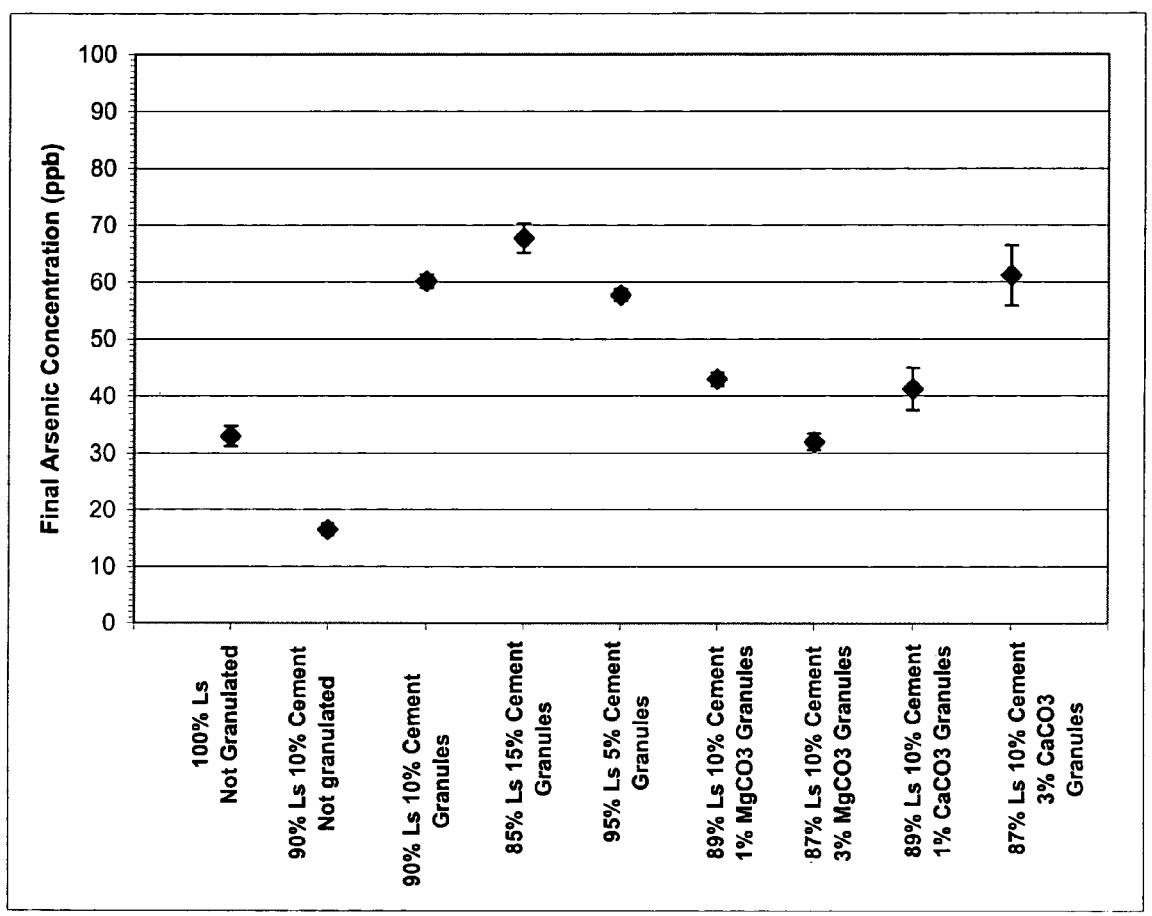
FIG. 9 is a graph depicting arsenic removal by different limestone granule formulations.

Batch tests were performed to compare arsenic removal by granules with 5 percent, 10 percent, and 15 percent binder. Batch tests were also done with one percent and three percent of each additive added to see how this improved arsenic removal efficiency. Each batch test with the granules used 1.5 grams of granules as the adsorbent and 100 mL of 100 ppb arsenic solution. The granules used were 2 to 4 mm in size and were made using ball-milled Minnekahta Limestone (typically <0.001 mm size). FIG. 9 shows final arsenic concentrations of each batch test. Batch tests were also done with 1.5 grams of ball-milled limestone (not granulated) and 90 percent limestone/10 percent binder (not granulated) as a performance comparison for the granules.

The batch test that showed the highest removal efficiency had 90% (1.35 g) ball-milled Minnekahta limestone and 10 percent Portland cement. The materials in this batch test were not granulated. Powdered cement performs well as an arsenic removal agent, but causes the pH and conductivity of the final solution to be elevated. The pH values were about 11.5 and conductivity ranged from about 1,700 to 1,900 μmhos/cm.

Arsenic removal efficiency decreased as the percent Portland cement binder was increased. With 5% binder, the final arsenic concentration was 50 ppb. With 10 percent binder, the final concentration increased to 60 ppb, and with 15 percent binder, the final arsenic concentration was 68 ppb. Research by Kundu et al. (2004) shows that at pH values above 7, arsenic removal by hardened cement decreases, and at about pH 10, removal efficiency is 84 percent. Optimum pH for arsenic removal by hardened cement is 4 to 5, with a maximum observed removal of 94 percent. Final pH of the batch tests using limestone granules was about 10. At higher binder concentrations, the binder could also be coating more of the surface area of the limestone and reducing its effectiveness as an arsenic removal agent.

Granules with magnesium carbonate as an additive and calcium carbonate as an additive showed promise as an arsenic removal agent. The final arsenic concentration of the batch test with one percent $MgCO_3$ averaged 43 ppb, while the batch test with three percent $MgCO_3$ averaged 32 ppb. This final concentration is similar to the batch test of an equal mass of ball-milled limestone (not granulated), which had a final arsenic concentration of 33 ppb. Thus, using granulation and three percent of additive ($MgCO_3$), the same level of arsenic removal efficiency was achieved as with powdered limestone, with the added benefit of being in a form that can be readily used as a filter medium. The final pH of solutions with doped granules ranged from about 10 to 10.5 and conductivity ranged from 100 to 125. Undoped limestone has a final solution pH of 9.6 and a conductivity of about 60.

Calcium carbonate did not show as much promise as an additive as magnesium carbonate. The batch test with one percent $CaCO_3$ had a final arsenic concentration of 41, while the batch test with three percent $CaCO_3$ had a concentration of 67. The reason for this increase is unclear, although batch tests with CaCO$_3$ completed previously have shown that arsenic removal using this additive varies unpredictably and is consistently a poorer performer than magnesium carbonate.

Example VII

Column Study of Arsenic Removal with Granular Limestone

Two column studies were completed to compare the efficiency of manufactured limestone-based granules to crushed limestone. One column was run with 1-2 mm size manufactured limestone-based granules (containing Minnekahta Limestone, Portland cement binder, and reagent-grade magnesium carbonate) and the other column was run with 1-2 mm sieve size limestone as a comparison. Both columns used 100 ppb arsenic solution. Column size was 12 inches long by 1 inch diameter.

Figure 10:
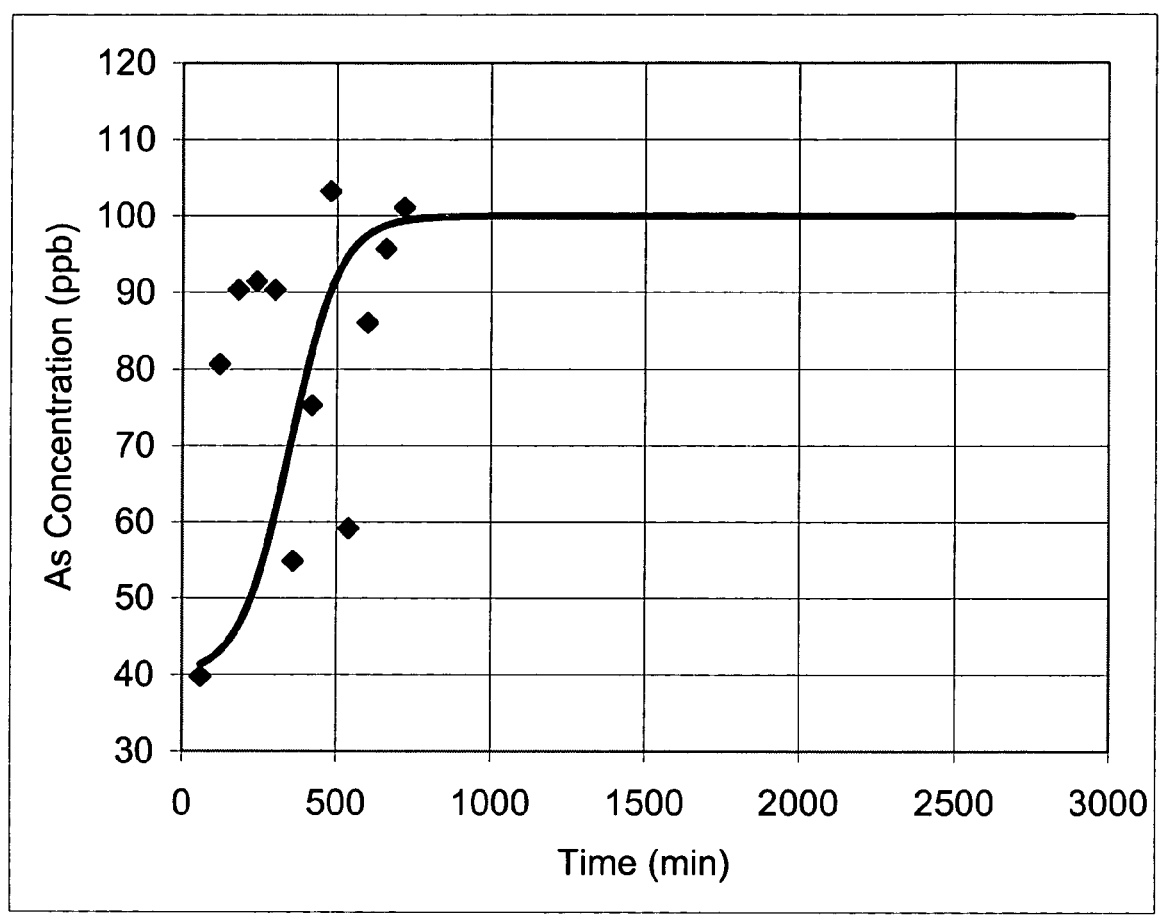
FIG. 10 is a graph depicting the result of a column study using 12 inch by 1 inch diameter column, Minnekahta limestone, sieve size 1-2 mm, influent arsenic concentration 100 ppb, and flow rate 8 bed volumes per hour (BV/hr).

The column of 1-2 mm sieve size washed Minnekahta Limestone was packed with 249.6 grams of material. FIG. 10 is a plot of the measured effluent arsenic concentration during the total run time of 720 minutes (12 hours). Based on this graph, the time of breakthrough at 10 ppb occurred prior to the first sampling at 60 minutes. Flow through the column was 1.2 liters per hour (eight bed volumes per hour). About 14.5 liters of water passed through the column before complete exhaustion of the column material. This corresponds to about 97 bed volumes.

Figure 11:
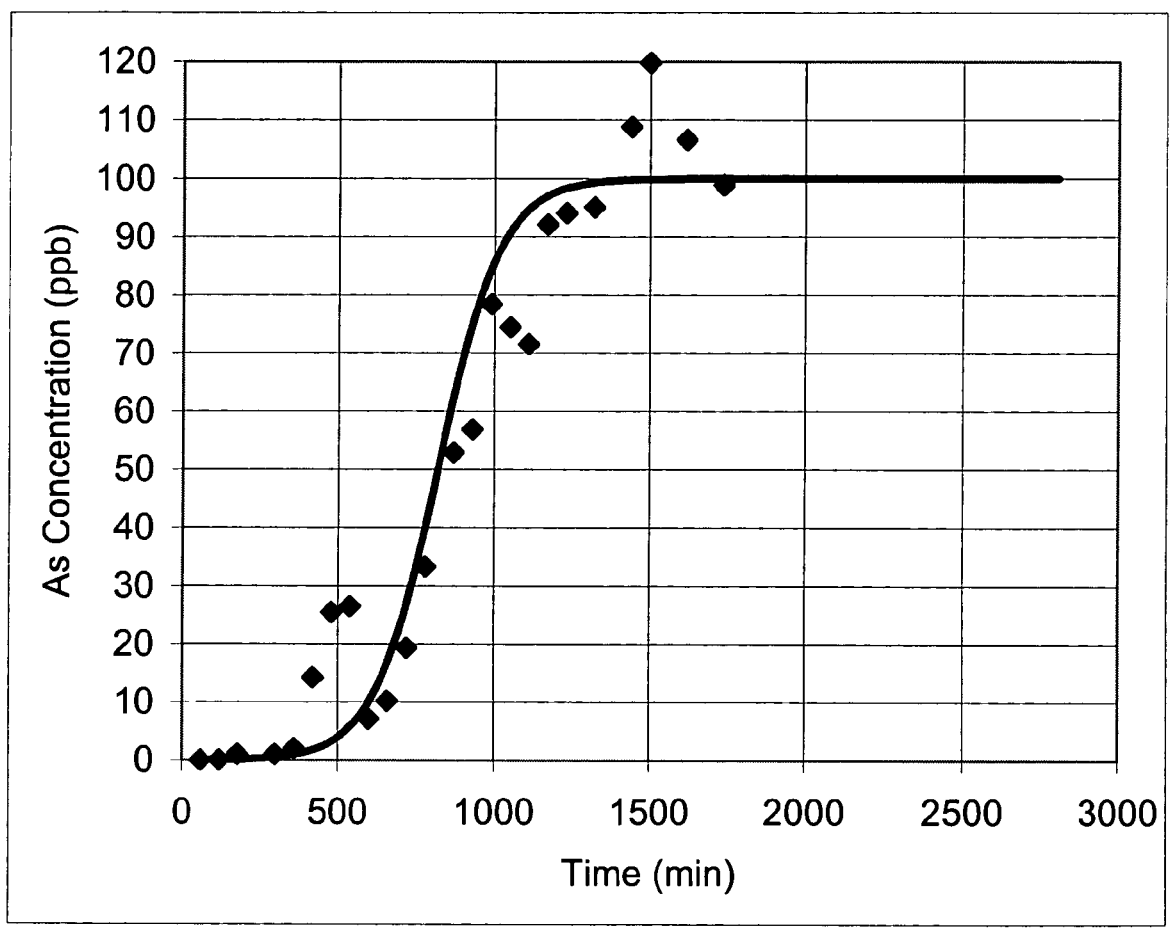
FIG. 11 is a graph depicting the result of a 12×1.5 inch column study with manufactured granules as the adsorbent.

The column of 1-2 mm diameter manufactured limestone-based granules was packed with 159.248 grams of material. The granules consisted of 87 percent ball-milled Minnekahta Limestone, 10 percent Portland cement binder, and 3 percent reagent grade magnesium carbonate. FIG. 11 is a plot of the measured effluent arsenic concentration during the total run time of 1,740 minutes (29 hours). Based on this graph, the time of breakthrough at 10 ppb was about 600 minutes (10 hours). Flow through the column was 1.2 liters per hour (eight bed volumes per hour). About 12 liters of water passed through the column before breakthrough occurred. This corresponds to about 80 bed volumes. About 35 liters of water passed through the column before complete exhaustion of the column material. This corresponds to about 233 bed volumes. This study shows that limestone-based granules with magnesium carbonate added as an additive performed at least one order of magnitude better than limestone chips of equal diameter.

Example VII

BET Surface Area Measurement

Specific surface area was analyzed using the Micromeritics Gemini III 2375 specific surface area analyzer. Batch experiments have shown that the smaller the limestone particle size, the greater the percent arsenic removal per gram of limestone. As particle size decreases, the effective surface area per gram of the stationary phase increases. BET (Brunauer, Emmett, and Teller) specific surface area analysis was completed to determine the total surface area of the different materials. Table 2 is a summary of the BET specific surface area results for materials used in batch and column experiments.

BET results show that ball-milled limestone varies in surface area from about 0.8 to 4.6 m$^2$/g. Manufactured limestone granules composed of varying amounts of ball-milled Minnekahta Limestone, Portland cement binder, and magnesium carbonate have surface areas greater than ball-milled limestone. Granule surface areas ranged from about 4.4 to 6.4 m$^2$/g. BET results of granular ferric hydroxide (GFH) indicate that the surface area of GFH is about 140 times greater than that of ball-milled Minnekahta Limestone.

TABLE 2

BET Surface Area Measurements

| Sample Description | BET Surface Area (m$^2$/g) |
|---|---|
| Ball-milled Minnekahta Limestone (<0.001 mm) | 0.7922 |
| Ball-milled Minnekahta Limestone (<0.001 mm) | 0.8815 |
| Ball-milled Minnekahta Limestone (<0.001 mm) | 4.6806 |
| Manufactured granules composed of 10% Portland cement and 90% Minnekahta Limestone | 5.3051 |
| Manufactured granules composed of 15% Portland cement and 85% Minnekahta Limestone | 6.3898 |
| Manufactured granules composed of 10% Portland cement, 87% Minnekahta Limestone, and 3% reagent grade MgCO$_3$ | 4.3692 |
| Portland cement binder used in granulation | 2.1813 |
| Plaster of Paris binder used in granulation | 3.8623 |
| Illite clay (<4 μm, or 4 micrometers) | 9.7051 |
| MgCO$_3$—Reagent Grade | 22.2600 |
| Granular Ferric Hydroxide | 128.6405 |

Example VIII

Particle Size Analysis

Particle size analysis on different types of limestone materials, reagent grade chemicals used as additives, and clay materials, was performed using the Microtrac Model S3000 Particle Size Analyzer. This instrument uses the phenomenon of scattered light from laser beams projected through a stream of suspended particles to measure particle size. The amount and direction of light scattered by the suspended particles were measured by an optical detector array and analyzed using Microtrac software. Results are reports as average particle size in microns.

TABLE 2

Particle size measurements

| Material Type | Average Particle Size (microns) |
|---|---|
| Minnekahta Limestone (<0.5 mm sieve size) | 15.82 |
| Minnekahta Limestone (ball-milled on Apr. 14, 2003) | 6.66 |
| Minnekahta Limestone (ball-milled on Apr. 12, 2004) | 6.55 |
| Madison Limestone (<0.5 mm sieve size) | 15.23 |
| Madison Limestone (ball-milled) | 7.60 |
| Madison Dolomite (<0.5 mm sieve size) | 16.44 |
| Madison Dolomite (ball-milled) | 7.93 |
| Minnelusa Formation (<0.5 mm sieve size) | 13.95 |
| Minnelusa Formation (ball-milled) | 9.08 |
| Kentucky Limestone (ball-milled) | 3.34 |
| Calcite Rock-Turkey (ball-milled) | 53.42 |
| Aragonite (CaribSea brand) (ball-milled) | 56.02 |
| CaCO$_3$ (reagent grade) (Fisher brand) | 10.81 |
| CaCO$_3$ (reagent grade) (Aldrich brand) | 64.66 |
| MgCO$_3$ (reagent grade) | 16.34 |
| Illite (<4 micrometers) | 4.73 |
| Montmorillonite (<4 micrometers) | 4.28 |
| Kaolinite (<4 micrometers) | 7.40 |

These results provide an average particle size for the limestone materials, additives used to improve arsenic removal efficiency, and clay materials used in batch experiments. Ball-milling of limestone material generally reduced the average particle size to the level of microns (0.001 mm), far less than half of that seen in the limestone that was sieved to less than 0.5 mm. The calcite rock from Turkey was not ball-milled long enough to produce consistently smaller particles.

Example IX

Characterization of Crystal Contents using X-Ray Diffraction Analysis

Figure 12:
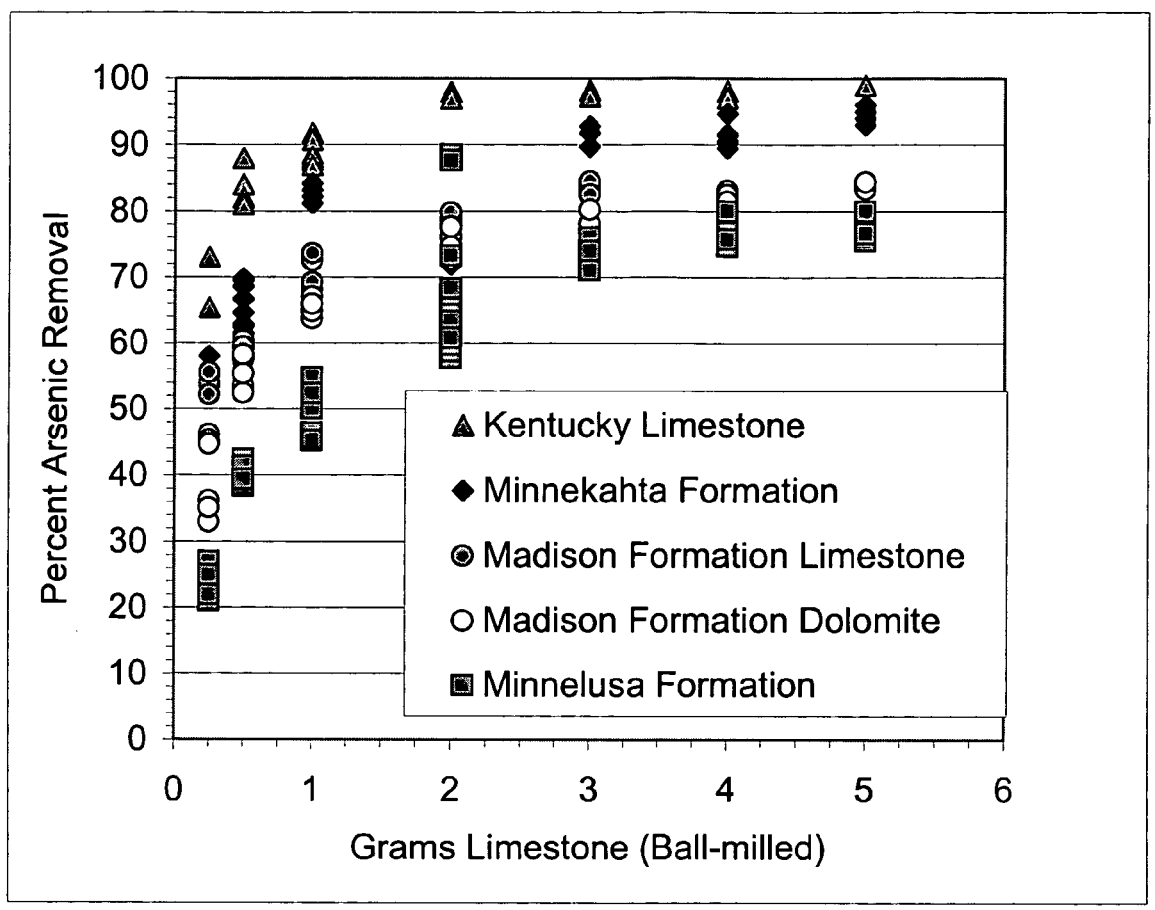
FIG. 12 is a graph depicting a batch-test comparison of arsenic(V) removal by five rock types.

Table 3 shows XRD analysis results for five different limestone or dolomite formations. These rock units are all from the Black Hills of South Dakota, except one limestone unit from Kentucky (Ste. Genevieve Limestone). By comparing the percent arsenic removal of each rock type (FIG. 12) with the XRD results (Table 3), it is clear that the rock types with the most calcite show the highest arsenic removal rates.

For the Saint Genevieve limestone (Kentucky limestone), which contains about 95% calcite and 4% dolomite, 0.5 grams of limestone removes more than 80% of the arsenic. For the Minnekahta limestone, which contains about 93% calcite but no measurable dolomite, one gram of limestone is required to remove more than 80% of the arsenic. For the Madison Formation dolomite and limestone, both of which contain about 98% dolomite and 1-2% calcite, five grams of the rock were required to consistently remove more than 80% of the arsenic. The Minnelusa Formation did not consistently remove 80 percent of the arsenic even at five grams of rock in the batch test. This is likely due to the numerous impurities in this rock formation, including pyrrhotite, illite, microcline, and kaolinite.

Example X

Characterization of the Long Term Stability of the Waste Product

Encapsulation of Arsenic-Treated Limestone in Concrete Mortar

The Toxicity Characteristic Leaching Procedure (TCLP) test was performed in accordance with requirements in Environmental Protection Agency (EPA) Method SW 1311. The TCLP test showed that the final leachate concentration of arsenic was 7 ppb from a test with arsenic-treated limestone waste with a solid concentration of 2.22 mg arsenic per kilogram of waste. The arsenic leachate concentration is substantially below the current TCLP leachate concentration limit set for arsenic-containing waste disposal in a landfill (5 mg/L). Thus, the TCLP test has indicated significant stability of the limestone waste product. Therefore, arsenic treated limestone waste product is nonhazardous and is suitable for disposal in municipal landfills. Table 4 shows the TCLP results for the arsenic-treated limestone prior to concrete encapsulation and for the concrete mortar mixes after 7 and 14 days of curing. All samples passed the TCLP limit for arsenic of 5 ppm. Results indicate that the arsenic treated limestone can also be used as an aggregate in making concrete. Based on TCLP results and thermal analyses results, the arsenic-limestone waste product is thermally stable and can be used as a raw material in cement kilns for manufacturing cement. Thermal analysis of arsenic desorption from the waste product was analyzed on a TA 2960 SDT. The samples were heated from room temperature to 1550° C. at a heating rate of 20° C./min under a flowing atmosphere (100 mL/min) in air. The TCLP test results showed that no arsenic desorbed from arsenic-limestone waste after thermal analysis. Additionally, the TCLP concentrations before and after thermal analysis were 0.007 mg/kg and <0.001 mg/kg, respectively. The decrease in arsenic leachate concentration after thermal analysis could be due to an increased stability of calcium arsenate compounds.

TABLE 3

XRD analysis results for five limestone and dolomite rock formations.

| Limestone Type and Source | XRD Analysis Results | |
| --- | --- | --- |
| Saint Genevieve Limestone-Kentucky | Calcite-95.5% +/−2.3 | Quartz-0.2% +/−0.1 |
| | Dolomite-4.3% +/−0.7 | |
| Minnekahta Limestone-Rapid City, SD | Calcite-92.7% +/−2.1 | Microcline-1.2% +/−0.8 |
| | Quartz-2.9% +/−1.3 | Albite-0.2% +/−0.2 |
| Madison Formation Limestone-Rapid City, SD | Dolomite-97.8% +/−3.4 | Quartz-0.2% +/−0.2 |
| | Calcite-2.0% +/−0.8 | |
| Madison Formation Dolomite-Rapid City, SD | Dolomite-98.5% +/−2.7 | Quartz-0.4% +/−0.2 |
| | Calcite-1.1% +/−0.6 | |
| Minnelusa Formation-Rapid City, SD | Dolomite-84.3% +/−4.3 | Pyrrhotite-2.0% +/−2.0 |
| | Quartz-6.6% +/−1.1 | Illite-1.6% +/−1.0 |
| | Calcite-3.9% +/−1.0 | Microcline-0.8% +/−0.4 |
| | | Kaolinite-0.7% +/−0.4 |

TABLE 4

TCLP results for the arsenic-treated limestone and the concrete mortar mixes

| Mix I.D. | TCLP results (ppb As) of arsenic treated limestone | TCLP results (ppb As) of Concrete mortar mix after 7 days | TCLP results (ppb As) of Concrete mortar mix after 14 days |
| --- | --- | --- | --- |
| MN2 | 5 | <5 | <5 |
| MN3 | 39 | <5 | <5 |
| MN4 | 45 | <5 | <5 |

Example XI

Characterization of the Long Term Stability of the Waste Product

Thermal Stability

Toxicity Characteristic Leaching Procedure (TCLP, Method SW 846-1311) tests performed showed that arsenic-treated limestone waste product is non-hazardous and is suitable for disposal in municipal landfills. Results from a concrete study also showed that limestone waste product can be used as an aggregate in making concrete.

The potential for using the solid arsenic-limestone waste product as a raw material in cement kilns was evaluated. All the samples were analyzed on a TA 2960 SDT. The samples were heated from room temperature to 1550° C. at a heating rate of 20° C./min under a flowing atmosphere (100 mL/min).

Thermogravimetric analysis (TGA) of arsenic-limestone waste sample in air showed that substantial weight loss occurred at about 920° C. and thermal decomposition was completed around 1000° C. The major weight loss is estimated to be from the release of water and $CO_2$. Acid digestion of the sample before and after thermal analysis showed that no arsenic desorbed from arsenic-limestone waste (2.22 mg As/kg). Additionally, the TCLP concentrations before and after thermal analysis were 0.007 mg/kg and <0.001 mg/kg, respectively. The decrease in arsenic leachate concentration after thermal analysis could be due to an increased stability of calcium arsenate compounds. The weight loss of limestone waste in air is 43.3%. Therefore, from the results it can be concluded that the limestone waste product is thermally stable and can be used as a raw material in cement kilns for manufacturing cement.

Example XII

Enhancement of Arsenic Removal Efficiency by Magesium Carbonate

Magnesium-Acetate-Treated Calcium Carbonate Particles

Figure 13:
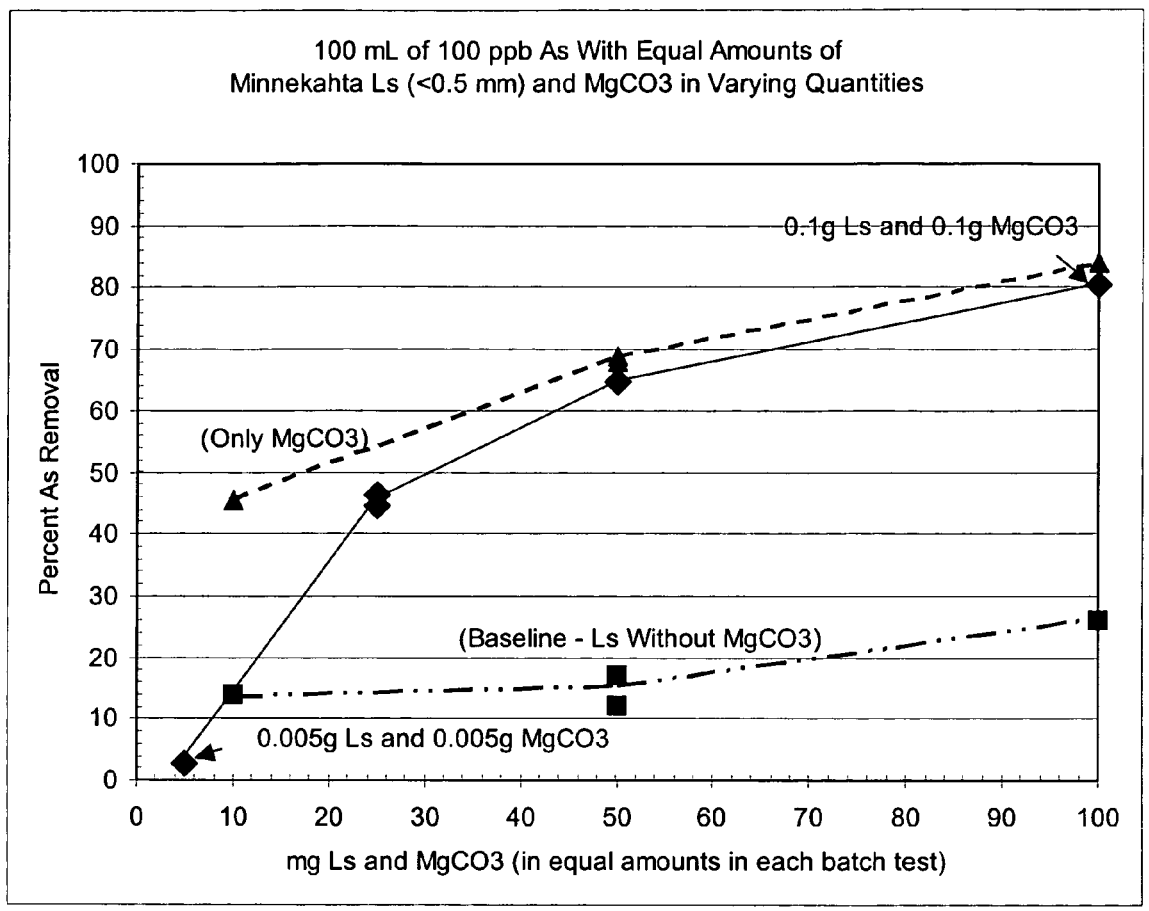
FIG. 13 is a graph depicting a batch-test comparison of equal amounts of arsenic removal by limestone, $MgCO_3$, and mixtures of equal amounts of limestone and $MgCO_3$.

In FIG. 13, a direct comparison of the removal of arsenic by limestone with $MgCO_3$ was made. Magnesium carbonate effectively removes arsenic at 80-90%. The use of magnesium carbonate improves the removal efficiency (relative to limestone) by a factor of 10.

Example XIII

Enhancement of Arsenic Removal Efficiency by Magnesium Carbonate

Formulation with Magnesium Carbonate Particles (Aggregates)

Figure 14:
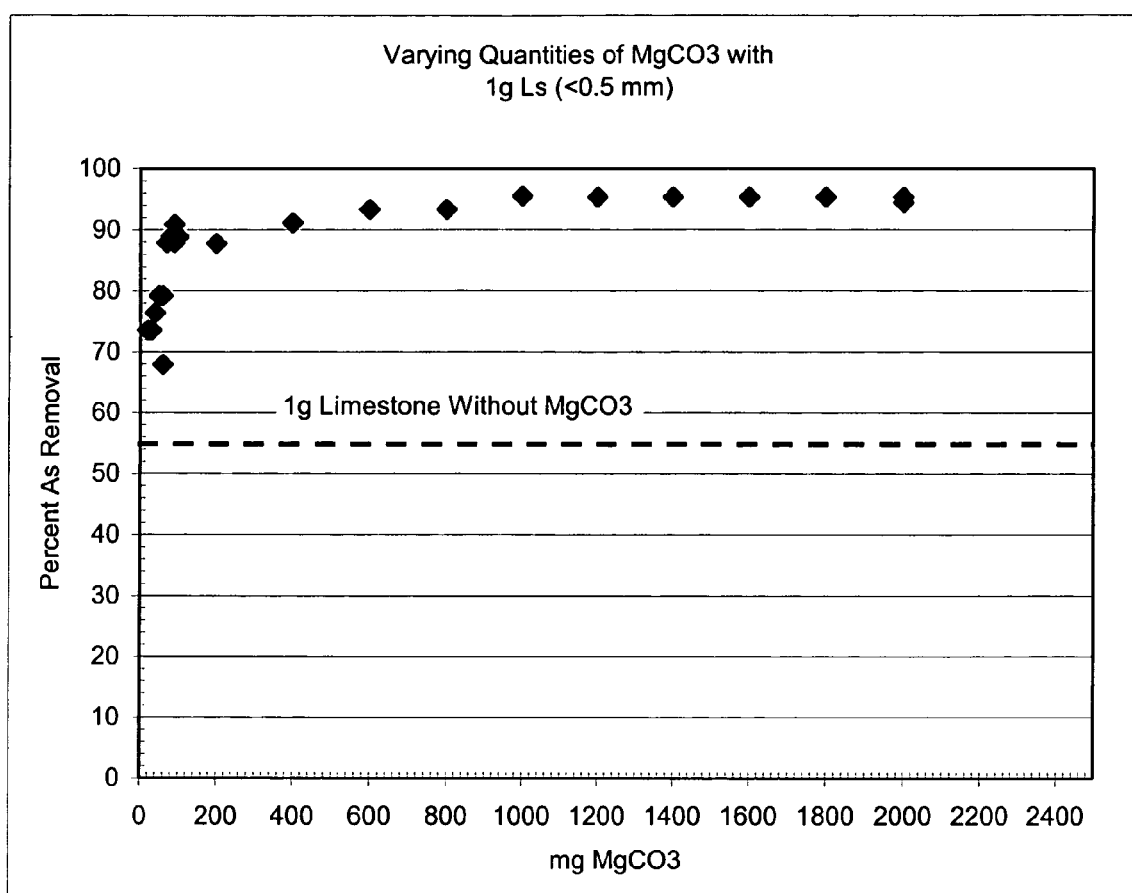
FIG. 14 is a graph depicting the effect of the amount of magnesium carbonate on the arsenic removal efficiency.

FIG. 14 cover a wide range of mg dopant levels of magnesium carbonate, from 10 mg/g limestone to 2000 mg/g limestone. The benefit of adding the dopant levels off above 100 mg/g limestone.

The examples set forth above are provided to give those of ordinary skill in the art with a complete disclosure and description of how to make and use the preferred embodiments of the compositions and how to use the preferred embodiments of the methods, and are not intended to limit the scope of what the inventors regard as their invention. Modifications of the above-described modes (for carrying out the invention) that are obvious to persons of skill in the art are intended to be within the scope of the following claims. All publications, patents, and patent applications cited in this specification are incorporated herein by reference as if each such publication, patent, or patent application were specifically and individually indicated to be incorporated herein by reference.

What is claimed is:

1. An arsenic removal medium for reducing the total concentration of arsenic compounds in water comprising calcium carbonate particles from calcium carbonate mineral in its natural or raw material form and at least one binder, wherein the calcium carbonate mineral is at least 70% calcium carbonate particles.

2. The arsenic removal medium of claim 1, wherein the calcium carbonate mineral is selected from the group consisting of calcite, aragonite, dolomite, and mixtures thereof.

3. The arsenic removal medium of claim 1, wherein the calcium carbonate mineral comprises at least about 80% by weight of calcite.

4. The arsenic removal medium of claim 3, wherein the calcite is from limestone, marble, or mixtures thereof.

5. The arsenic removal medium of claim 1, wherein the calcium carbonate mineral comprises at least about 50% by weight of dolomite.

6. The arsenic removal medium of claim 5, wherein the dolomite is from dolomite rocks.

7. The arsenic removal medium of claim 1, further comprising magnesium carbonate.

8. The arsenic removal medium of claim 7, further comprising magnesium carbonate aggregates, wherein the magnesium carbonate aggregates are formed by contacting the calcium carbonate particles with an aqueous solution of a magnesium salt at an effective concentration.

9. The arsenic removal medium of claim 8, wherein the magnesium salt is a water-soluble magnesium salt of an organic acid selected from the group of carboxylic acids, hydroxycarboxylic acids, and dicarboxylic acids.

10. The arsenic removal medium of claim 9, wherein the organic acid is acetic acid.

11. The arsenic removal medium of claim 7, wherein the magnesium carbonate is in the form of magnesium carbonate particles.

12. The arsenic removal medium of claim 11, wherein the magnesium carbonate particles are made from reagent-grade magnesium carbonate.

13. The arsenic removal medium of claim 1, wherein the binder is a hydraulic cement.

14. The arsenic removal medium of claim 1, wherein the calcium carbonate particles are reacted with magnesium salts to form a coating of magnesium carbonate.

15. The arsenic removal medium of claim 13, wherein the hydraulic cement is Portland cement, modified Portland cement or masonry cement.

16. The arsenic removal medium of claim 1, wherein the binder is alkaline silicates, silica hydrosol, alumina, silica-alumina, gypsum, plaster of paris, or colloidal clays.

17. The arsenic removal medium of claim 1, wherein the calcium carbonate particles have a Brunaur, Emmett, and Teller (BET) specific surface area from 0.1 to 20 $m^2/g$.

18. The arsenic removal medium of claim 1, wherein the calcium carbonate particles have a density no less than 0.2 $g/cm^2$.

19. The arsenic removal medium of claim 18, wherein the calcium carbonate particles have a density from 0.5 to 2.0 $g/cm^2$.

20. The arsenic removal medium of claim 1, wherein the calcium carbonate particles have a Brunaur, Emmett, and Teller (BET) specific surface area from 0.1 to 20 $m^2/g$ and a particle size diameter of approximately 0.001 to approximately 7 mm.

21. The arsenic removal medium of claim 1, wherein the calcium carbonate particles have a Brunaur, Emmett, and Teller (BET) specific surface area from 0.2 to 10 $m^2/g$ and a particle size diameter of approximately 0.001 to approximately 2 mm.

22. The arsenic removal medium of claim 1, wherein the calcium carbonate particles have a Brunaur, Emmett, and Teller (BET) specific surface area from 0.3 to 5 $m^2/g$ and a particle size diameter of approximately 0.001 to approximately 1 mm.

23. The arsenic removal medium of claim 1, wherein the calcium carbonate particles have a Brunaur, Emmett, and Teller (BET) specific surface area from 2 to 8 $m^2/g$ and a particle size diameter of approximately 0.005 to approximately 1 mm.

* * * * *